(12) United States Patent
Beard et al.

(10) Patent No.: US 11,960,945 B2
(45) Date of Patent: Apr. 16, 2024

(54) MESSAGE PASSING CIRCUITRY AND METHOD

(71) Applicant: Arm Limited, Cambridge (GB)

(72) Inventors: Jonathan Curtis Beard, Austin, TX (US); Curtis Glenn Dunham, Austin, TX (US); Andreas Lars Sandberg, Cambridge (GB); Roxana Rusitoru, Cambridge (GB)

(73) Assignee: Arm Limited, Cambridge (GB)

( * ) Notice: Subject to any disclaimer, the term of this patent is extended or adjusted under 35 U.S.C. 154(b) by 455 days.

(21) Appl. No.: 17/225,674

(22) Filed: Apr. 8, 2021

(65) Prior Publication Data

US 2022/0327009 A1    Oct. 13, 2022

(51) Int. Cl.
| | |
|---|---|
| G06F 9/46 | (2006.01) |
| G06F 9/54 | (2006.01) |
| G06F 12/02 | (2006.01) |
| G06F 12/1009 | (2016.01) |
| G06F 15/78 | (2006.01) |

(52) U.S. Cl.
CPC .............. *G06F 9/546* (2013.01); *G06F 9/542* (2013.01); *G06F 12/023* (2013.01); *G06F 12/1009* (2013.01); *G06F 15/7817* (2013.01)

(58) Field of Classification Search
CPC ........ G06F 9/546; G06F 9/542; G06F 12/023; G06F 12/1009; G06F 15/7817
See application file for complete search history.

(56) References Cited

U.S. PATENT DOCUMENTS

| | | |
|---|---|---|
| 10,474,575 B2 | 11/2019 | Beard et al. |
| 2009/0073978 A1 | 3/2009 | Craddock et al. |

OTHER PUBLICATIONS

International Search Report and Written Opinion of the International Searching Authority for PCT/GB2022/050388 dated May 11, 2022, 17 pages.
R. Titos-Gil, "Architectural support for efficient message passing on shared memory multi-cores" Journal of Parallel and Distributed Computing, vol. 95, Mar. 9, 2016, pp. 92-106.

*Primary Examiner* — Gregory A Kessler
(74) *Attorney, Agent, or Firm* — NIXON & VANDERHYE P.C.

(57) ABSTRACT

Message passing circuitry comprises lookup circuitry responsive to a producer request indicating message data provided on a target message channel by a producer node of a system-on-chip, to obtain, from a channel consumer information structure, selected channel consumer information associated with a given consumer node subscribing to the target message channel. Control circuitry writes the message data to a location associated with an address in a consumer-defined region of address space determined based on the selected channel consumer information. When an event notification condition is satisfied for the target message channel and the given consumer node, and an event notification channel is to be used, event notification data is written to a location associated with an address in a consumer-defined region of address space determined based on event notification channel consumer information associated with the event notification channel.

19 Claims, 12 Drawing Sheets

|   | 112 | 114 | 116 | 118 |
|---|---|---|---|---|

| 01: | st64 [cmd q], #event, event_log VA, 2 /** items**/, wfe VA |
|---|---|
| 02: | st64 [cmd q], (va base target1, wfe VA, count items) |
| 03: | st64 [cmd q], (va base target2, wfe VA, count items) |
| 04: | ldex [wfe VA] |
| 05: | wfe |

| Entry ID | NodeID (92) | PASID (94) | VA Base (95) | Count (96) | WFE (98) | Next (90) | Event notification data (110) |
|---|---|---|---|---|---|---|---|
| 0 | 2 | 6435 | 0x12 | 30 | 0x70 | ----- | |
| 1 | 2 | 6435 | 0xff | 20 | 0 //event notification channel | 4 | 102 |
| 2 | 27 | 760 | 0x30 | 8 | 0x88 | ----- | |
| 3 | 2 | 6435 | 0x7c | 15 | 0 //event notification channel | ----- | 299 |
| 4 | 8 | 345 | 0xff | 16 | 0xff | ----- | |

FIG. 8

MESSAGE PASSING CIRCUITRY AND METHOD

BACKGROUND

Technical Field

The present technique relates to the field of system-on-chips (SoCs).

Technical Background

A system-on-chip (SoC) may have a number of circuit nodes which may communicate with each other. Software executing at one node may need to obtain data produced by another node of the SoC. One approach can be that the producer node and the consumer node may use a shared region of memory to exchange messages. However, use of shared memory may introduce coherency issues and may not scale well especially if the same messages from a producer are to be received by multiple consumers.

SUMMARY

At least some examples provide message passing circuitry for message passing between nodes of a system-on-chip; the message passing circuitry comprising: lookup circuitry responsive to a producer request indicating message data provided on a target message channel by a producer node of the system-on-chip, to obtain, from a channel consumer information structure for specifying channel consumer information for a plurality of message channels and one or more consumer nodes of the system-on-chip subscribing to the message channels, selected channel consumer information associated with a given consumer node subscribing to the target message channel; and control circuitry to: write the message data indicated by the producer request to a location associated with an address in a consumer-defined region of address space determined based on the selected channel consumer information; and when an event notification condition is satisfied for the target message channel and the given consumer node: when event notifications for the target message channel are to be provided to the given consumer node in response to the event notification condition, provide the event notification to the given consumer node; and when event notifications for the target message channel are to be provided on an event notification channel of said plurality of message channels, cause event notification data to be written to a location associated with an address in a consumer-defined region of address space determined based on event notification channel consumer information associated with the event notification channel.

At least some examples provide a system-on-chip comprising: a plurality of nodes; and message passing circuitry to pass messages between the nodes, the message passing circuitry comprising: lookup circuitry responsive to a producer request indicating message data provided on a target message channel by a producer node of the system-on-chip, to obtain, from a channel consumer information structure for specifying channel consumer information for a plurality of message channels and one or more consumer nodes of the system-on-chip subscribing to the message channels, selected channel consumer information associated with a given consumer node subscribing to the target message channel; and control circuitry to: write the message data indicated by the producer request to a location associated with an address in a consumer-defined region of address space indicated by the selected channel consumer information; and when an event notification condition is satisfied for the target message channel and the given consumer node: when event notifications for the target message channel are to be provided to the given consumer node in response to the event notification condition, provide the event notification to the given consumer node; and when event notifications for the target message channel are to be provided on an event notification channel of said plurality of message channels, cause event notification data to be written to a location associated with an address in a consumer-defined region of address space determined based on event notification channel consumer information associated with the event notification channel.

At least some examples provide a method for message passing between nodes of a system-on-chip; the message passing circuitry comprising: in response to a producer request indicating message data provided on a target message channel by a producer node of the system-on-chip: obtaining, from a channel consumer information structure for specifying channel consumer information for a plurality of message channels and one or more consumer nodes of the system-on-chip subscribing to the message channels, selected channel consumer information associated with a given consumer node subscribing to the target message channel; writing the message data indicated by the producer request to a consumer-defined region of address space indicated by the selected channel consumer information; and when an event notification condition is satisfied for the target message channel and the given consumer node: when event notifications for the target message channel are to be provided to the given consumer node in response to the event notification condition, providing the event notification to the given consumer node; and when event notifications for the target message channel are to be provided on an event notification channel of said plurality of message channels, causing event notification data to be written to a consumer-defined region of address space determined based on event notification channel consumer information associated with the event notification channel.

Further aspects, features and advantages of the present technique will be apparent from the following description of examples, which is to be read in conjunction with the accompanying drawings.

BRIEF DESCRIPTION OF THE DRAWINGS

FIG. 8 shows channel consumer information supporting use of the event notification channel;

DESCRIPTION OF EXAMPLES

Event Notification Channel for Message Passing

Figure 1:
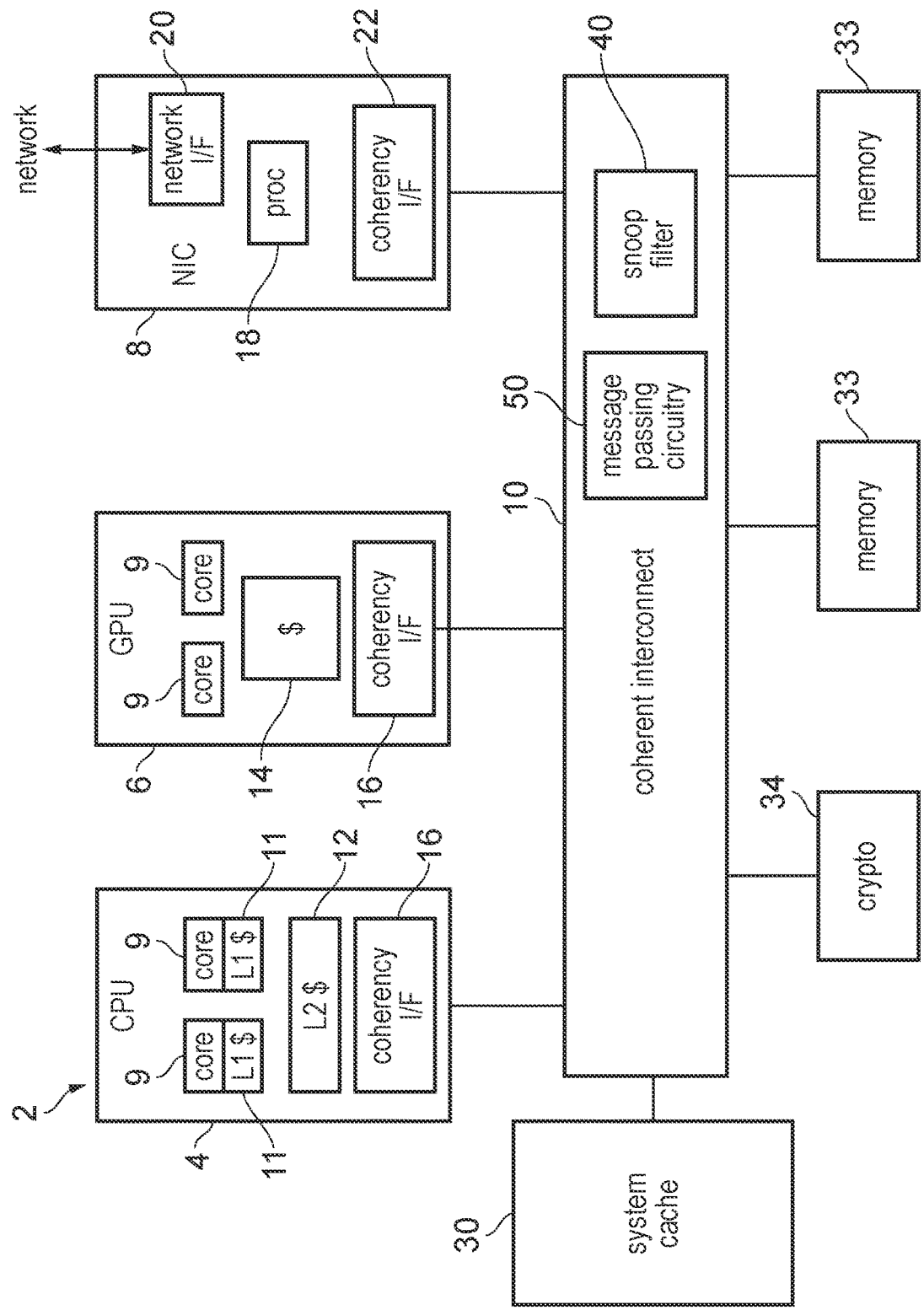
FIG. 1 schematically illustrates an example of a system-on-chip having message passing circuitry.

Message passing circuitry is provided for enabling message passing between nodes of a system-on-chip (SoC). The message passing circuitry comprises lookup circuitry for looking up information from a channel consumer information structure which specifies channel consumer information for two or more message channels and one or more consumer nodes of the SoC subscribing to the message channels. In response to a producer request indicating message data provided on a target message channel by a producer node of the SoC, the lookup circuitry obtains, from the channel consumer information structure, selected channel consumer information associated with a given consumer node which subscribes to the target message channel. Control circuitry writes the message data indicated by the producer request to a location associated with an address in a consumer-defined region of address space determined based on the selected channel consumer information.

With this approach, messages can be passed from a producer node to a consumer node even if the producer node and consumer node do not share access to a shared region of physical memory. The message passing circuitry provides hardware acceleration implementing a message passing channel which can be viewed as a tunnel or wormhole between an address space of the producer node and an address space of the consumer node. As the address to which the message data is written may be defined by the consumer node using the selected channel consumer information, the producer node does not need to have access to the address where the message data is to be written. Also, as the consumer node can read the message from a region of consumer-defined address space in memory, rather than from hardware structures within the message passing circuitry, this approach is more scalable to different numbers of consumers and different numbers of channels than would be the case in an alternative approach using hardware storage of a limited capacity within the message passing circuitry for buffering the messages until they can be read by a consumer node.

The message passing circuitry can provide an event notification to a given consumer noted when an event notification condition is satisfied for the target message channel. For example the event notification could be that a certain number of messages have been received on the target message channel, or that message data meeting a particular criterion or set of criteria has been received. For some channels, event notifications may be provided direct to the given consumer node when the event notification condition occurs on a given message channel. However, for some consumer nodes, this approach can incur a performance overhead for a consumer node if the consumer node wishes to monitor for event notifications on multiple message channels. The monitoring mechanisms supported by some consumer nodes may only support monitoring for a single event notification at a time, and there may be a high development cost in modifying such consumer nodes to support monitoring of notifications on multiple channels more efficiently. As a result, some consumer nodes may have to resort to polling (speculatively reading data from multiple addresses of memory, to check whether there is any event of interest for the different channels being monitored), which can reduce performance when multiple channels are to be monitored for events.

In the examples discussed below, an event notification channel may be defined as one of the message channels supported by the message passing circuitry. The event notification channel can be used to receive event notifications which arise on other message channels. Hence, when a producer request is received on a target message channel and an event notification condition is satisfied for the target message channel and the given consumer node, the control circuitry may determine whether event notifications for the target message channel are to be provided direct to the given consumer node or to be provided on an event notification channel. When event notifications are to be provided on the event notification channel, event notification data is written to a location associated with an address in a consumer-defined region of address space indicated by event notification channel consumer information associated with the event notification channel.

Effectively, the event notification channel may be regarded as similar to the other message channels implemented by the message passing circuitry (e.g. the circuitry for configuring the channel consumer information for event notification channels or controlling writing of message data or detection of event notification conditions could be shared with that for performing the corresponding functions on other message channels). However, for the event notification channel, the producer node is effectively the message passing circuitry itself rather than a separate node of the SoC. Hence, when event notifications arise on other channels, event notification data can be written to the region of address space defined for the event notification channel. This means that a given consumer node wishing to subscribe to multiple message channels can monitor all of these channels, by monitoring the event notification channel for notifications, rather than needing to monitor for notifications separately for each individual channel within the group of channels it wishes to monitor. This allows a consumer node which does not have architectural support for monitoring multiple channels to nevertheless receive notifications about multiple message channels without needing to poll locations associated with each channel individually. This helps to improve performance.

The control circuitry and the lookup circuitry may support the channel consumer information indicating that two or more message channels share the same event notification channel. This allows event notifications for a group of channels to be defined as using the same event notification channel to allow a consumer to subscribe to a single channel which provides updates on multiple other message channels. There may be various ways in which the channel consumer information could indicate the relationship between a given message channel and its corresponding event notification channel. For example the channel consumer information for a given channel/consumer pair could include a field which may be set to provide a channel identifier indicating the channel to be used as the event notification channel for providing the event notifications for that particular message channel and consumer.

The control circuitry and the lookup circuitry may also support two or more different consumer nodes subscribing to a same message channel, with each of the two or more consumer nodes associated with respective items of channel consumer information specifying a respective consumer-defined region of address space to which message data is to be written in response to a producer request for that message channel. Hence, the different consumer nodes subscribing to the same message channel may specify different regions of address space to which the messages are to be written, so that the same message may need to be written to multiple different regions of address space by the message passing circuitry when a producer request is received on a message channel with multiple subscribers. Hence, this approach is scalable to different numbers of consumer nodes subscribing to the same channel. Where event notification channels are to be used then the different consumer nodes may also specify different event notification channels which may correspond to different (potentially overlapping) subsets of message channels so that when an event notification condition arises on a given message channel then this could require different consumer-defined event notification data to be written to two or more different event notification channels which may have been configured by respective consumers subscribing to the same message channel.

Hence, in some examples, the channel consumer information structure may have a number of channel consumer information entries, each entry corresponding to a given message channel and specifying channel consumer information defined by a particular consumer node subscribing to the given message channel. There could be multiple entries for the same message channel, if multiple consumers have subscribed to that channel. There can be different ways of organising the channel consumer information structure, e.g. as a content-addressable-memory (CAM) structure searchable by channel identifier which has a mechanism which permits multiple hits for the same channel identifier to allow multiple consumers on the same channel; or alternatively the channel consumer information structure could include a channel lookup structure providing one entry per channel and a channel consumer information table providing the channel consumer information entries mentioned earlier, where the entry in the channel lookup structure corresponding to a given message channel specifies the channel consumer information entry of the channel consumer information table at a head of a linked list of entries corresponding to the given message channel, and each channel consumer information entry can specify a pointer to a next entry in the linked list in cases when there are multiple consumers subscribing to the same channel. An alternative to a linked list could be that each entry of the channel lookup structure could specify a bitmap indicating which entries of the channel consumer information table correspond to the channel identifier of a given message channel.

The channel consumer information structure can be implemented in hardware registers of the message passing circuitry, or as a memory-based data structure from which entries can be read from memory by the lookup circuitry of the message passing circuitry. If a memory-based data structure is used, it is possible for the message passing circuitry to include a channel consumer information cache for caching portions of the channel consumer information structure for faster access than if they have to be read from memory.

The event notification channel may itself have an event notification condition associated with it, and when the control circuitry determines that an event notification condition has been satisfied for the event notification channel then the control circuitry may provide an event notification to the given consumer node. For example the event notification condition could be that a certain number of items of event notification data have been written to the event notification channel. Hence, it is not necessary to notify the consumer node in response to each instance of writing event notification data to the location associated with the event notification channel.

The event notifications could be implemented in different ways. In one example the event notification could, for example, be an interrupt sent to the given consumer node to interrupt processing at the given consumer node to inform the given consumer node that there is information associated with a monitored message channel available. However, interrupting processing at the consumer node each time an event notification occurs may be considered disruptive to performance.

Another approach can be that the event notification may be provided to the given consumer node by issuing a write request requesting a write to a location associated with an event notification address indicated in the selected channel consumer information. The event notification address may be defined by the given consumer node when it subscribes to the target message channel.

Some processor architectures may support a wait for event (WFE) mechanism where a processor may set a memory address for which updates are to be monitored. A WFE instruction may be supported which, when executed causes the processor to halt processing in a given thread, to wait for any one of a set of WFE events to occur. WFE events can include occurrence of an interrupt, entry into a debug mode, or a write being detected to a monitored address previously designated by the processor. The WFE mechanism can allow a processor to enter a power saving state or switch to processing a different thread in a period of time when waiting for a WFE event to occur.

Hence, when monitoring for updates on a message channel, software can set a given address (registered with the message passing circuitry as the event notification address for receiving event notifications for a given channel) as the monitored address for a WFE event, and execute a WFE instruction to allow power saving or allow other operations to be performed in the period when waiting for an event notification, to avoid the software needing to laboriously poll memory to check for event notifications. Hence, when an event occurs on a given message channel (including the event notification channel), the event notification may be sent to the given consumer node by writing to the consumer-defined event notification address indicated in the selected channel consumer information, which can provide an efficient way of enabling the consumer to be informed of events on a message channel.

However, some processor architectures may only support WFE events relating to monitoring of a single address at a time, so even if there is support for a WFE mechanism as mentioned above, if multiple channels need to be monitored then on such architectures the consumer node could define the same WFE address as the event notification address for each channel, but in that case then when the event notification is received, the consumer would not know which channel the event relates to and would then need to poll locations in memory associated with each channel individually to investigate which message channel is the one for which the event was generated, which can be inefficient as the number of channels being monitored increases.

Hence, the use of the event notification channel can be particularly useful to allow processors having such an architecture to reduce the performance cost of monitoring multiple channels by avoiding a need to poll multiple channels individually after a WFE event has occurred, since instead it is possible to poll a location associated with the single event notification channel and obtain the event notification data which has been pushed to the event notification channel regarding events on multiple other message channels.

The event notification data which is pushed on the event notification channel when an event notification arises for another channel can have different forms. For example the event notification data could identify the message channel on which the event notification condition was satisfied. However, in practice the channel identifiers used by the hardware of the message passing circuitry may not be meaningful to the software on the consumer node. Therefore, in some examples it can be useful for the event notification data to comprise a consumer-defined value specified in the selected channel consumer information associated with the given consumer node subscribing to the target message channel. By providing the ability for the given consumer node, when subscribing to the target message channel, to indicate a consumer-defined value which is to be provided as the event notification data when an event occurs on the corresponding channel, this means that the event notification channel may provide information meaningful to the consumer software which may identify the specific event that has occurred. From the point of view of the message passing circuitry, the consumer-defined value may simply be an arbitrary value and may not have meaning to the hardware of the message passing circuitry, but by providing hardware support in the message passing circuitry for the consumer to register with the message passing circuitry the consumer-defined value to be provided as event notification data, this can simplify software processing of event notifications.

The event notification condition can be implemented in different ways. In some implementations, the event notification condition may be fixed by the message passing circuitry, independent of any information specified by the given consumer node in the channel consumer information for a given channel/consumer node pair. However, it can be useful for the event notification condition to be a consumer-defined event notification condition so that different consumers may specify different conditions governing when event notifications are sent and/or different channels may have different event notification conditions defined for them.

The criteria used to evaluate whether the event notification condition is satisfied could also vary. For example, an event notification condition could be satisfied if a message provided on the target message channel satisfies certain criteria, e.g. that it was received from a particular producer node or has a message payload meeting certain criteria.

However, in practice the format and meaning of the message payload may be specific to a particular producer and consumer, and so some implementations may not provide any circuitry at the message passing circuitry which applies any checking of the message payload contents. From the point of view of the hardware of the message passing circuitry, the message payload contents may simply be arbitrary binary data.

One type of event notification condition supported in the hardware can be to check whether a number of messages provided on the target message channel has reached or exceeded a threshold value. For example, this can enable buffer overflow to be detected, where the number of messages received on a given channel has exceeded the size of the buffer data structure allocated in memory for queuing the message data from that channel. In some cases the threshold value regarding the number of messages provided on the target message channel may be a fixed threshold specified in hardware, and in this case this may constrain the consumer node to define, as a region of buffer space to accept message data for a given message channel, a region of sufficient size to accept at least the threshold number of messages.

However, it can be particularly useful if the threshold value is a consumer-defined threshold value specified by the given consumer node. For example, when sending a subscription request to subscribe to a given message channel, the consumer node may specify the consumer-defined threshold value. This gives more flexibility for consumers to allocate memory address space for buffers of different sizes depending on their needs, so that one consumer (which has allocated a relatively small buffer) may request notification after a certain number of messages have been received on a channel and another consumer (having allocated a larger buffer) may request notification after a greater number of messages have been received.

Counting of the number of messages provided on the target message channel could be implemented in different ways. For example, part of the channel consumer information could be a count field which is incremented or decremented each time a message is received on the corresponding message channel. In one approach, the count value may initially be zero when a consumer first subscribes to a message channel and a separate field may be provided specifying the threshold for the consumer-defined event notification condition, and then each time a message is received the count value may be incremented and the event notification condition may be considered to be satisfied once the count value has reached the threshold. In this case, the count value can also be used to determine an offset relative to a buffer base address identifying the consumer-defined region of address space for which message data is to be written, with the offset indicating the relative location within that buffer space at which the latest message received on the channel is written.

Alternatively, another approach can be that a decrementing counter is used for the count field so that it is initially set to the threshold value when the consumer subscribes to the target message channel and then is subsequently decremented each time a message is received on that message channel until it reaches 0 at which point the event notification is triggered (either being provided direct to the consumer node or being provided on the event notification channel). In this case, an address identifying the consumer-defined region of address space can also be incremented by an amount corresponding to a size of a single message each time a producer request is received for that channel, so that the next time a producer request is received for the same channel the message data of that second producer request will be written to the next location in the consumer-defined region of address space after the location at which the message data of the previous producer request was written. Alternatively, a base address identifying the consumer-defined region of address space could remain constant but a separate incrementing count field counting the number of messages could be used to generate offsets relative to the base address at which each successive message is to be written.

In response to a channel subscription request from a subscribing consumer node specifying an identifier associated with a given message channel, the control circuitry may update the channel consumer information structure to specify channel consumer information for the subscribing consumer nodes subscribing to the given message channel. For example the channel subscription request may specify information provided by the subscribing consumer node which can be used to control how the message passing circuitry passes messages to that consumer. For example the channel subscription request may specify at least one of: the address of the consumer-defined region of address space to be specified in the channel consumer information for the subscribing consumer node subscribing to the given message channel; a consumer-defined event notification condition to be specified in the channel consumer information for the subscribing consumer node subscribing to the given message channel; and an event notification address to which the control circuitry is to write when providing the event notification to the subscribing consumer node for the given message channel. Hence, this allows a subscribing consumer node to configure the message passing for a given channel. Different consumer nodes can define different parameters relating to the same message channel. The identifier used to identify a given message channel could be a message handle value which may be a software-defined value agreed between a producer and a consumer. In some examples the message passing circuitry may have a channel lookup structure which maps the message handle value to one or more entries of channel consumer information in the channel consumer information structure.

Part of the channel subscription request may be an indication of whether the subscribing consumer node is requesting subscription to an event notification channel or a message channel other than the event notification channel. Hence, a common event subscription mechanism may be used, but a parameter in the subscription request may specify what type of channel is being configured.

When the channel subscription request specifies that the subscribing consumer node is requesting subscription to a given message channel other than an event notification channel, for which event notifications are to be provided on the event notification channel, the channel subscription request may specify a consumer-defined value to be provided as the event notification data on the event notification channel when the event notification condition is satisfied for the given message channel. Hence, as discussed above the consumer may register a value with the message passing circuitry which is to be used as the event notification data pushed to the event notification channel, to allow software to understand what event has occurred.

There may be various ways in which the association between a given message channel and its corresponding event notification channel can be indicated in the subscription request. For example, the event channel subscription request could specify the message channel handles of the relevant message channels for which that event notification channel is to be used. However, this approach may limit the number of message channels which can share the same event notification channel.

A more flexible approach can be used, in implementations where the channel subscription request for a given message channel specifies an event notification address field for specifying an event notification address to which the control circuitry is to write when providing the event notification to the subscribing consumer node for the given message channel. In this case, one way of associating the corresponding channel subscription requests for a non-event notification channel and the event notification channel can be that, following processing of an event channel subscription request which specifies that the subscribing consumer node is requesting subscription to the event notification channel, in response to receipt of a channel subscription request for the given message channel for which the event notification address field specifies a same address as the event notification address field of the event channel subscription request, the control circuitry sets the channel consumer information for the subscribing consumer node subscribing to the given message channel to indicate that event notifications for the given message channel are to be provided on the event notification channel. Hence, it is assumed that a given message channel, for which the consumer node specifies the same event notification address as the event notification address used for a previously configured event notification channel, should have its event notifications reported through the event notification channel. This avoids the need for additional fields in an event notification channel subscription request for specifying channel handles of the associated group of message channels, so requires less modification to the format of subscription requests used for non-event-notification message channels. Also this approach is scalable to any number of message channels being grouped into an event notification group.

The channel subscription request may be a write request issued by the subscribing consumer node which specifies, as a target address, an address mapped to a command interface associated with the message passing circuitry. Hence, this does not need the subscribing consumer node to support a dedicated signal protocol in hardware to implement the subscription request, as instead the subscription request may be a standard memory write operation which writes to a memory-mapped address which corresponds to the command interface of the message passing circuitry. The write data associated with the write request may specify channel subscription information such as the address of the consumer-defined region of address space, a threshold for a consumer-defined event notification condition, or an event notification address as discussed above.

Similarly, a producer request (sent by a producer node to indicate there is message data to be passed on the channel) may comprise a write request issued by the producer node specifying as a target address an address mapped to a message interface associated with the message passing circuitry. This message interface could be the same interface as the command interface in some examples, or alternatively the message interface may be separate from the command interface, with the message interface and command interface being mapped to different memory addresses in a physical address space. Hence, the producer does not need to support a specific signal protocol in hardware for message passing, but can issue its producer request by issuing memory write operations to a memory mapped address.

Hence, by using memory writes as a mechanism for sending producer requests or subscription requests, this provides an implementation which is more scalable and requires less hardware modification at the producer and consumer ends.

The producer interface may support a mechanism to allow the producer request to either success or fail. Hence, when the control circuitry is unable to process the message indicated by a given producer request, the control circuitry may return a failure indication to the producer node in response to the producer request. By supporting a failure mechanism so that the producer can be informed of failed messages so that they can be retried by the producer, this can allow the message passing circuitry to be more efficient in terms of circuit area and power and to be more scalable to different numbers of producers and channels and different levels of message traffic. If no failure mechanism was supported, then this would the message passing circuitry would need sufficient buffer space for buffering received messages until they can be processed, as there would be no mechanism to indicate to the producer that the message should be retried, and so this may require overprovisioning of buffer capacity to deal with worst case message demand, and this would also constrain the scalability of the message passing circuitry since any chosen buffer capacity may be insufficient once the number of producers or level of demand increases beyond a certain threshold. In contrast, by supporting a failure mechanism the amount of buffer capacity needed can be reduced to a more feasible size without constraining scalability since if any local buffer capacity at the message passing circuitry becomes full then failure indications can be returned to producers until buffer capacity becomes available again.

In general, the failure indication may be returned if the control circuitry is unable to process the message indicated by a given producer request for any reason. There may be multiple reasons why a failure indication may be returned. For example, the failure indication could be returned if there is insufficient buffer capacity at the message passing circuitry to accommodate the request. Also, a failure indication could be returned if other error conditions have arisen, e.g. that the producer request has specified an identifier of a message channel which is invalid or has not yet been properly configured by software. Optionally, a failure response could also be returned if the message channel is valid but no consumer nodes have yet subscribed to that channel. This can be helpful to reduce the likelihood of the producer sending further messages, to reduce unnecessary consumption of resources and power at the message passing circuitry for handling messages on channels where there are no consumers.

One way of providing a producer request mechanism which supports returning the failure indication can be if the producer request is an atomic write request which requests atomic updating of a block of data of size greater than one cache line, for example 64 bytes. The memory system architecture may provide a guarantee that, for a block of data updated by the atomic write request, the view of that block of data by other observers should be such that those other observers either observe the old value of the entire block (prior to being updated in response to the write request) or see the new values of data in the entire block (set in response to the write request), but where it is not possible for those other observers to see a partial update where some portions of the block have been updated and others have not. The particular micro-architectural implementation of this operation may vary and there can be a range of techniques for enforcing this guarantee. For example, some implementations may block other observers' requests to the target block being updated by the atomic write request until the entire block has been updated, while other implementations where they allow intervening requests to access the block from other observers but may cause a failure indication to be returned to the requester (and any partial updates to be reversed) in cases when an intervening read or write from another observer occurs to one of the portions of the target block between updating a first portion of the block and updating the last portion of the block. Regardless of how the atomicity is enforced for such an atomic write request, the atomic write request may support return of a success/failure indication, to allow for some implementations to use the return of the failure indication to avoid needing to lock access to the target block being updated. As such an atomic write request may support updating of a relatively large block of addresses, and can have support for returning a success/failure indication, this type of request can be useful to implement the producer request, as it allows a reasonable size of message payload data to be transferred in response to a single request, and also supports the returning of a failure indication if an error has occurred at the message passing circuitry.

Similarly, the channel subscription request could also be implemented using such an atomic write request, to give similar advantages to those explained for the producer request.

In some implementations, when the control circuitry causes message data for a given channel to be written to a location in the consumer-defined region of address space, that message data could simply be written to a region of memory. In this case when the consumer node subsequently processes the messages on a given channel the consumer nodes may issue read requests for addresses in the consumer-defined region of address space and these requests may miss in the consumers cache and so this may cause a delay to the consumer while the message data is read from memory into the consumers cache.

In another approach, cache stashing requests may be used by the control circuitry of the message passing circuitry to push message data to the consumer-defined region of address space, so that the message data can be pushed into the consumers cache avoiding the latency of a cache miss when the consumer comes to process that data. Hence, the control circuitry may write the message data indicated by the producer request to the location associated with the address in the consumer-defined region of address space, by issuing a cache stash request to request that the message data is stashed in a cache associated with the given consumer node. Some system-on-chip interconnect architectures may support a cache stashing request, which is a request to allocate data for a given address into a specified cache, where the cache stashing request is initiated by a node of the SoC other than the node whose cache is the recipient of the stashed data. In implementations which support cache stashing, the channel consumer information for a given message channel could also include a node identifier identifying the cache into which message data is to be stashed.

Similarly, for the event notification channel, when event notification data is to be pushed to the event notification channel, this may use the same mechanism as pushing of message data for other message channels. The event notification data can either be written to memory without cache stashing, or could be stashed in the consumer's cache by using a cache stashing request as described above.

Some examples may support cache stashing requests which indicates, as the target address for which data is to be stashed in a consumers cache, a physical address identifying the data within a physical address space. However, with this approach then in practice the message passing circuitry may need to implement address translation circuitry to allow translation of virtual addresses to physical addresses. In practice, since the message passing circuitry may be shared between a number of consumers which may each use different virtual to physical address mappings there can be a relatively large overhead in the message passing circuitry implementing address translation functionality.

Hence, another approach can be that the cache stash request specifies a virtual address within the consumer-defined region of address space and an address space identifier indicative of a translation regime for translating the virtual address into a physical address at the given consumer node. The virtual address and address space identifier to be used can be registered with the message passing circuitry when the consumer subscribes to the corresponding message channel. Hence, this avoids the message passing circuitry itself needing to perform address translation as instead its cache stash requests may specify the virtual address and address space identifier registered with it and then translation circuitry at the consumer node may then translate the virtual address into a physical address in order to control allocation of the stashed data in the cache of the consumer. This reduces the circuit area and power cost of implementing the message passing circuitry and allows reuse of address translation circuitry already provided at the consumer.

If virtual cache stash requests are used, the cache stash request specifying the virtual address may not necessarily specify the cached data itself. In one implementation, the cache stash request requesting cache stashing may provide the virtual address to the consumer, and the consumer may then respond with a physical address so that the data can then be forwarded by a subsequent request associated with the translated physical address.

The lookup circuitry and control circuitry of the message passing circuitry may be provided in a coherent interconnect which manages coherency between two or more caches associated with respective nodes of the SoC. In other examples the message passing circuitry could be a standalone component separate from such a coherent interconnect. However, a coherent interconnect can be a convenient place to implement to message passing circuitry as it may be at a point at which requests from multiple nodes having respective caches are received.

System-On-Chip Example

FIG. 1 schematically illustrates an example of a system-on-chip (SoC) 2 which includes a number of requester devices 4, 6, 8 and an interconnect 10 for managing coherency between the requester devices and other caches. The requester devices 4, 6, 8 and interconnect 10 are on-chip devices on the same integrated circuit. In this example the requester devices include a central processing unit (CPU) 4 for performing general purpose processing, a graphics processing unit (GPU) 6 for performing graphics processing and a network interface controller (NIC) 8 for controlling transmission and reception of data over a network. The CPU and a GPU include caches 11, 12, 14, e.g. level 1 caches associated with particular cores 9 and a shared level 2 cache 12 for the CPU or a shared cache 14 for the GPU (in practice, the cores 9 of the GPU could also have individual caches). The NIC 8 has processing circuitry 18 for controlling network packet transmission and reception, and a network interface 20 for transmitting the packets to the network and receiving packets from the network. Each of the requester devices 4, 6, 8 has a coherency interface 16, 22 for interacting with the coherent interconnect. For example, the coherency interface 16, 22 may be responsible for generating the required coherency protocol transactions in response to cache accesses from the relevant requester, and responding to snoop requests from the interconnect 10 with appropriate responses and changes of coherency state. It will be appreciated that this is just one example of some requester devices and other types of requesters could also be provided, such as display controllers for controlling display of data on a screen, or a DMA (direct memory access) controller for controlling transfer of data between memory and a peripheral device for example. Examples of coherency protocols which could be used are the AMBA® 4 ACE and AMBA® 5 CHI coherency protocols provided by ARM® Ltd of Cambridge, UK, but it will be appreciated that the techniques discussed herein could also be applied to other coherency protocols. A system cache 30 is coupled to the coherent interconnect 10 but not assigned to a particular requester device. The system cache 30 may be provided to speed up access to some cached data by the requesters compared to if all reads and writes from the requesters have to be served by main memory 33. The memory units 33 could include on-chip memory on the same integrated circuit as the requesters 4, 6, 8 and interconnect 10, or off-chip memory on a separate integrated circuit from the SoC 2. The interconnect may also be coupled to other types of device 34, such as a cryptographic unit for providing cryptographic support to operations performed on the requester devices. As shown in FIG. 1, the coherent interconnect 10 may (optionally) include a snoop filter 40 for tracking which data addresses are cached at certain requester devices 4, 6. The snoop filter 40 can be used to reduce snoop traffic by allowing the coherent interconnect 10 to determine when data is not cached at a particular requester. In some examples the system cache 30 and snoop filter 40 may be combined, with a single structure looked up based on an address to provide both cached data and snoop filter information associated with that address.

The coherency protocol supported by the coherent interconnect 10 is useful for allowing multiple requester devices to share access to a common region of memory. However, maintaining coherency between cached data at different requesters can introduce extra overhead and exchange of snoop traffic, which may have a performance and circuit area cost.

In some use cases it may be desirable for one requester to provide a message for another requester, where the requester sending the message does not need the data of the message after sending it, and so the overhead of maintaining coherency between data from a shared region of memory within the respective caches of the "producer" requester sending the message and "consumer" requester receiving the message can be unnecessary.

To eliminate the coherency overhead of passing such messages, the coherent interconnect 10 includes message passing circuitry 50 which provides a hardware interface which accelerates passing of messages from a virtual address space associated with a producer node of the system-on-chip to a virtual address space of a consumer node of the system-on-chip, without needing the producer node and consumer node to share access to a shared region of memory. Effectively, the message passing circuitry 50 may provide a wormhole between the two virtual address spaces so that when the producer node writes on one side of the wormhole, the message payload appears on the other side in the virtual address space of the consumer node, without the producer and consumer nodes needing to have access to a common region in the physical address space. This eliminates the coherency issues because it is not necessary to save the outgoing data of the message in the cache 11 of the producer. Example use cases where such message passing could be useful may include, for example, event driven programming and data centre use cases such as on a web server. The producer node could for example be the network interface controller 8 or a given processor core 9 in a CPU 4 or GPU 6, and the consumer node could be another core 9 within a CPU 4 or GPU 6 for example which is executing consumer software which is monitoring for receipt of the message from the producer.

Figure 2:
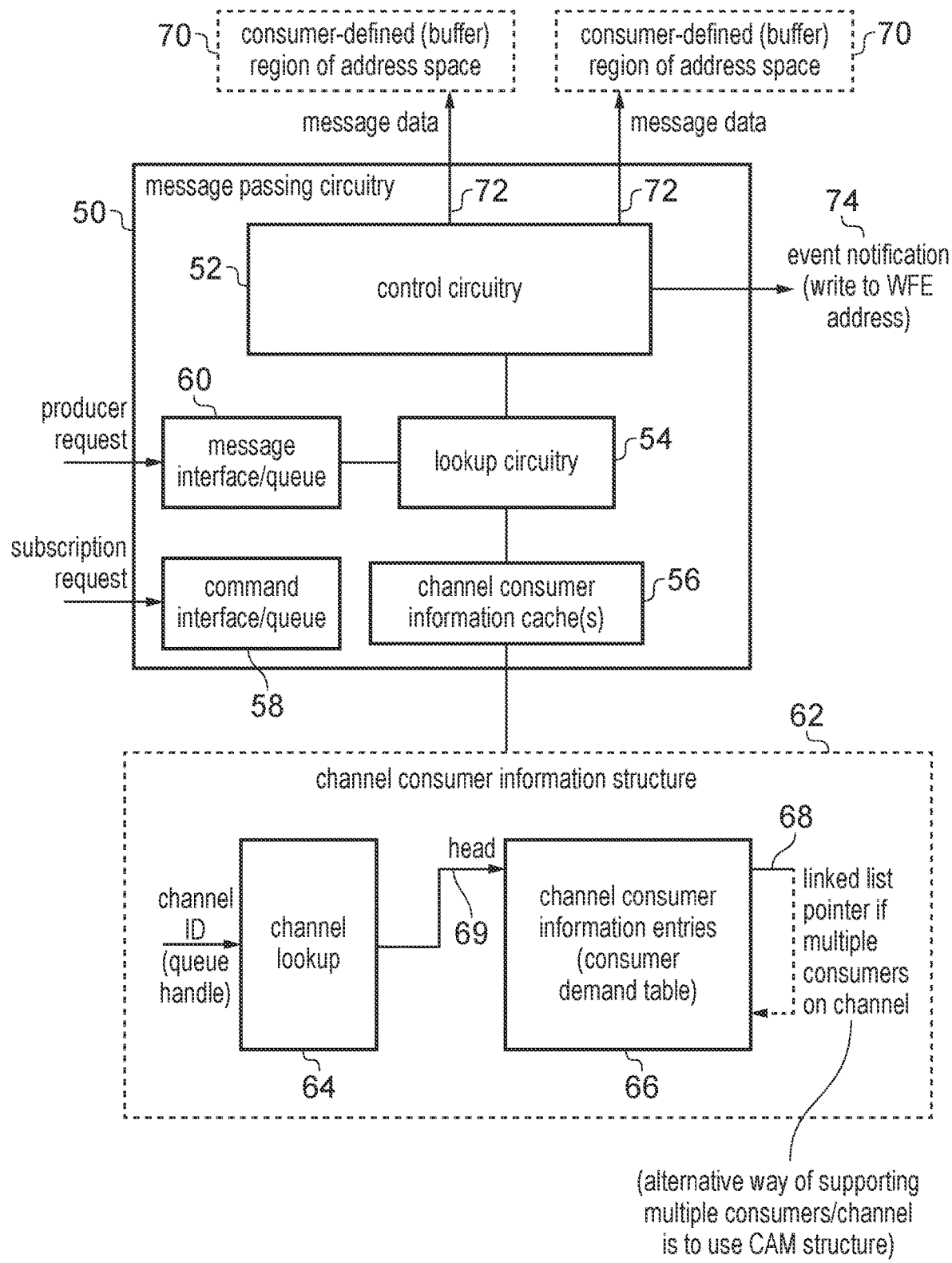
FIG. 2 illustrates the message passing circuitry in more detail.

FIG. 2 shows an example of the message passing circuitry 50 in more detail. The message passing circuitry 50 has control circuitry 52 for controlling the passing of messages from a producer node to a consumer node and lookup circuitry 54 for looking up information from a channel consumer information structure 62 which provides information regarding a number of message channels and a number of subscribing consumer nodes which have subscribed to receiving messages for the respective message channels. In the example shown in FIG. 2 the channel consumer information structure 62 is a memory-based structure stored in the memory system at addresses in a designated region of physical address space. The physical address space region used for the channel consumer information structure 62 may be configurable by supervisory software executing on one of the cores 9. For example, the message passing circuitry 50 could include a register (not shown) which specifies a base address of the channel consumer information structure 62 (or there could be multiple base addresses for identifying respective portions of the channel consumer information structure, e.g. separate base addresses for the channel lookup structure 64 and channel consumer information table 66 mentioned below).

While the channel consumer information structure is stored in memory, information from the channel consumer information structure may be cached within the message passing circuitry 50 for faster access, within one or more channel consumer information caches 56. For example, a subset of most recently used entries of the channel consumer information structure 62 could be cached in the consumer information cache 56.

An alternative to locating the channel consumer information structure 62 in memory can be to implement hardware registers within the message passing circuitry 50 which store the channel consumer information structure 62, and this may provide faster access to the channel consumer information structure as there would be no prospect of a cache miss causing a delay in accessing a particular entry of channel consumer information. However, the approach shown in FIG. 2 where the channel consumer information structure is stored in the memory space and cached in the message passing circuitry 50 may be more scalable to different sized channel consumer information structures. Either approach can be used.

In the example shown in FIG. 2, the channel consumer information structure 62 includes a channel lookup structure 64 and a channel consumer information table 66 providing a number of channel consumer information entries. The channel lookup structure is looked up based on a channel identifier (or message queue handle) specified by a producer request requesting passing the message on the message channel identified by the channel identifier, and the channel lookup structure 64 specifies for each channel identifier an indication of one of the channel consumer entries in table 66 which is at the head of a linked list of channel consumer entries defined by one or more consumers which have subscribed to the channel having the specified channel identifier. Each channel consumer information entry in the linked list, other than the final entry in the linked list, includes a pointer 68 to the following entry in the linked list, so that if there are multiple consumers subscribing to the same channel then the pointers can be followed to locate the channel consumer information entries for each consumer of that channel. The content of the channel consumer entries is described in more detail below, but in general can be used to identify a consumer-defined region of address space (a buffer) which has been defined by the relevant consumer node subscribing to the message channel as the buffer region 70 to which the control circuitry 52 should write the message payload received from the producer node.

While FIG. 2 shows an example where a linked list structure is used to support multiple consumers subscribing to the same channel, an alternative would be for the channel lookup structure 64 to specify, for each channel identifier, a bitmap indicating the particular channel consumer information entries defined by one or more respective consumers which have subscribed to that message channel. Alternatively, the channel lookup structure 64 and channel consumer information structure 66 could be combined into a single structure acting as the channel consumer information structure 62. For example, a content addressable memory (CAM) structure could be looked up by channel identifier, and may support multiple hits for the same channel identifier so that multiple consumers can have entries defined in the combined structure for the same channel. The CAM approach could be more feasible if the channel consumer information structure 62 is implemented using hardware storage within the message passing circuitry 50. The approach with separate channel lookup and channel consumer table structures 64, 66 may be more scalable by allowing the CAM lookup to be avoided and hence make it more feasible to use memory to store the channel consumer information structure 62. Nevertheless, it will be appreciated that there may be different ways of organising the channel consumer information structure 62 and in general any structure can be used which allows identification, for a given channel identifier, of one or more entries associated with consumers subscribing to that channel.

The message passing circuitry 50 has a command interface/queue 58 and a message interface/queue 60. Each interface includes a queue structure for buffering requests received by the message passing circuitry 50. The command and message interfaces 58, 60 are each mapped to at least one address in the physical address space, so that write requests to write data to an address mapped to the command interface 58 or an address mapped to the message interface 60 cause the write data of the write request to be inserted into the command or message queue 58, 60 to awaiting processing by the message passing circuitry 50. The command queue is used for any commands for configuring the operation of the message passing circuitry 50, such as supervisory commands for configuring the operation of the message passing circuitry (e.g. defining a base address for the channel consumer information structure as mentioned above), or a subscription request made by a consumer node to subscribe to a specified message channel. In response to a subscription request received from a given consumer node specifying a target message channel, when the command interface 58 processes the subscription request this may cause a new entry to be allocated into the channel consumer information structure 62 to indicate consumer-defined information for controlling how messages on the target message channel are supplied to the given consumer node.

The message interface/queue 60 is used to receive and process producer requests sent by a producer node to request passing of a new message to one or more consumers which are subscribed to the specified message channel. When a producer request is received at the message interface 60, then this causes the lookup circuitry 54 to lookup the channel consumer information structure 62 (possibly in the channel consumer information cache 56, if such a cache is provided) to identify channel consumer information for one or more consumers on the specified message channel and this channel consumer information is used by the control circuitry 52 to control writing of the messages to the consumer-defined regions of address space 70 defined by each consumer to the target message channel specified by the producer request. If an event notification condition is satisfied in response to the producer request, then also an event notification 74 may be provided to a given consumer. For example, the event notification 74 may be writing of data to a location associated with an WFE (wait for event) address as will be discussed in more detail below.

While FIG. 2 shows separate interfaces for the message interface 60 and command interface 58, it may also be possible to use a shared interface mapped to a common memory-mapped address. However, having separate message and command interfaces can help to allow commands to be prioritised over messages and also to allow memory management techniques to restrict access to the command interface compared to access to the message interface, as it may be desirable that some software processes which may need to send messages may not be allowed to send commands, so separating the interfaces 58, 60 can allow the address(es) mapped to the command interface 58 to be made inaccessible to such software processes.

Figure 3:
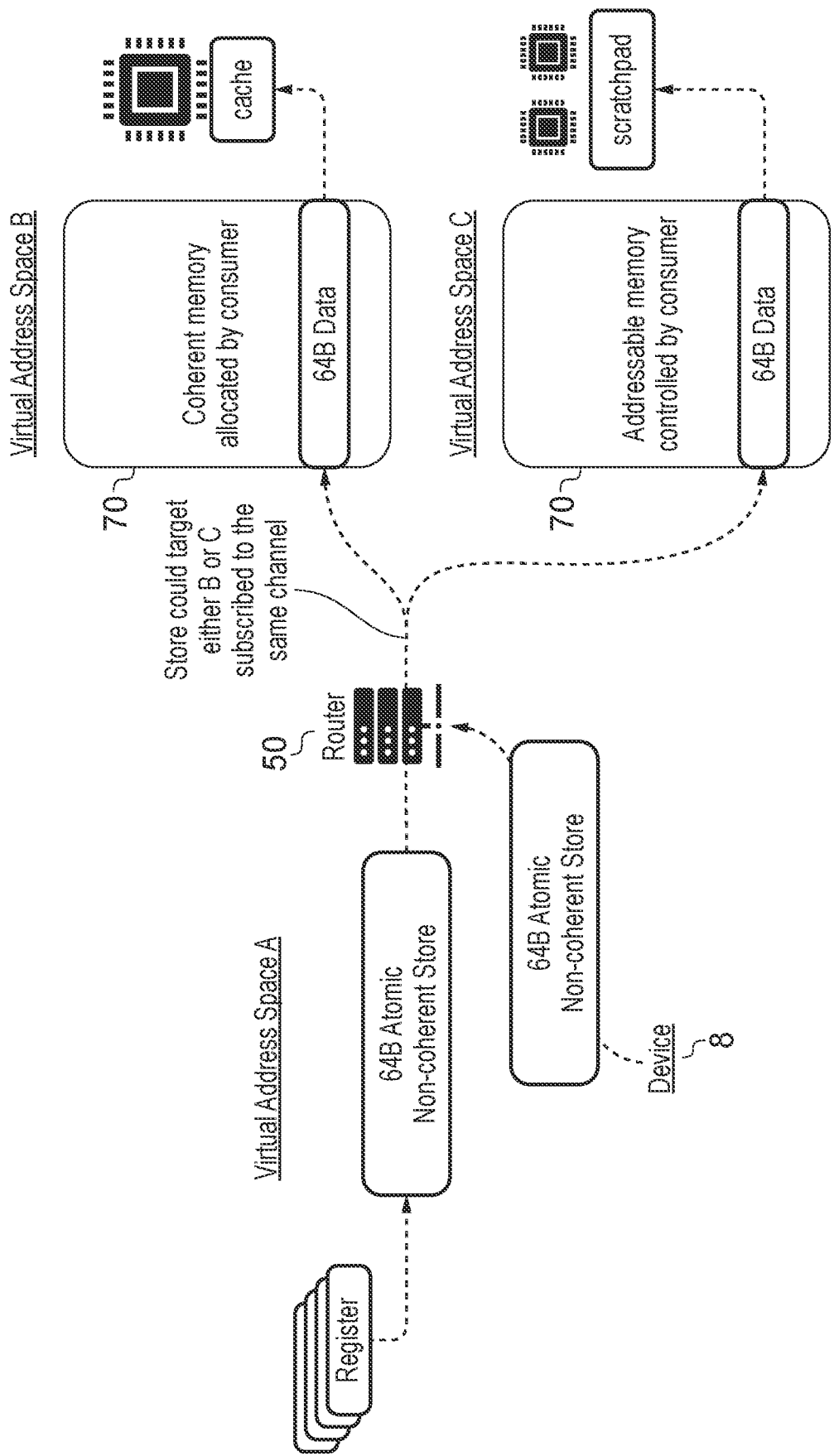
FIG. 3 schematically illustrates a concept of passing messages from a producer virtual address space to one or more consumer virtual address spaces via a message channel.

FIG. 3 schematically illustrates message passing using the message passing circuitry 50 (the message passing circuitry can also be called a "router" 50 in the following examples). In the example of FIG. 3, two different consumers B and C of the system-on-chip 2 (e.g. software executing on respective cores 9 within the SoC) may have subscribed to a given message channel and there may be one or more producer nodes which may produce messages on that message channel, for example software executing on another core 9 of the SoC associated with a virtual address space A or a device such as the network interface controller 8. In this example, the request used to send the producer request is a request to perform an atomic non-coherent store to a specified memory address, which in this example is a 64-byte atomic non-coherent store operation (although it will be appreciated that similar atomic non-coherent store operations may be performed on other sizes of blocks of memory). When sent as a producer request, the atomic non-coherent store operation specifies as its target address an address mapped to the message interface 60 of the router 50. The atomic nature of the atomic non-coherent store request is reflected in that the interconnect 10 or other parts of the memory system may provide a guarantee at an architectural level that the effects of the store request to update the 64 bytes (or other sized block) of memory will be seen atomically by other observers so that other observers are guaranteed to either see none of the updated values for the specified 64 bytes of memory or all of the updated values for the 64 bytes of memory, but cannot see a partial update where some of those 64 bytes have been updated while others have not. This may be enforced in different ways depending on the micro-architectural choices for a given processor implementation. For example, one approach could be to lock access to the specified 64 bytes until they have been updated while another approach may be to allow intervening accesses to the 64 bytes but track those accesses and in the case where an intervening access is made to a given portion of the 64 byte block in the period between updating a first portion of the 64 byte block and a last portion of the 64 byte block, any changes made by the 64 byte atomic non-coherent store request may be reversed and a failure indication may be returned to the requester that issued the store request. The non-coherent nature of the store request may be reflected by the fact that the data associated with the store request does not need to be stored within the cache 11, 14 of the requester that sent the request.

Hence, when the producer node issues the 64 byte atomic non-coherent store request representing the producer request, for which the write data to be written to those 64 bytes represents the message payload of the message to be sent to any consumer subscribed to the channel, the router 50 receives the request and buffers the request in its message buffer. When the router 50 is ready to process the message, the lookup circuitry 54 of the router 50 looks up the channel consumer information structure 62 based on a channel identifier specified in part of the store request. If the channel consumer information structure 62 indicates that there are any subscribers to that channel then, for each subscriber, the corresponding entry of channel consumer information is used to identify an address of a consumer-defined buffer region 70 in the respective consumer's virtual address space, and the message payload is written to a location within that buffer region 70 for each consumer. Different consumers may define different buffer regions 70 for the same channel, so there could be multiple writes of the same message data to different locations. By using the router 50, the producer node does not need to be aware of which locations in memory each consumer wishes the message to be written to, and there is no need for the producer and consumer to share access to those regions in memory, avoiding coherency overhead.

Figure 4:
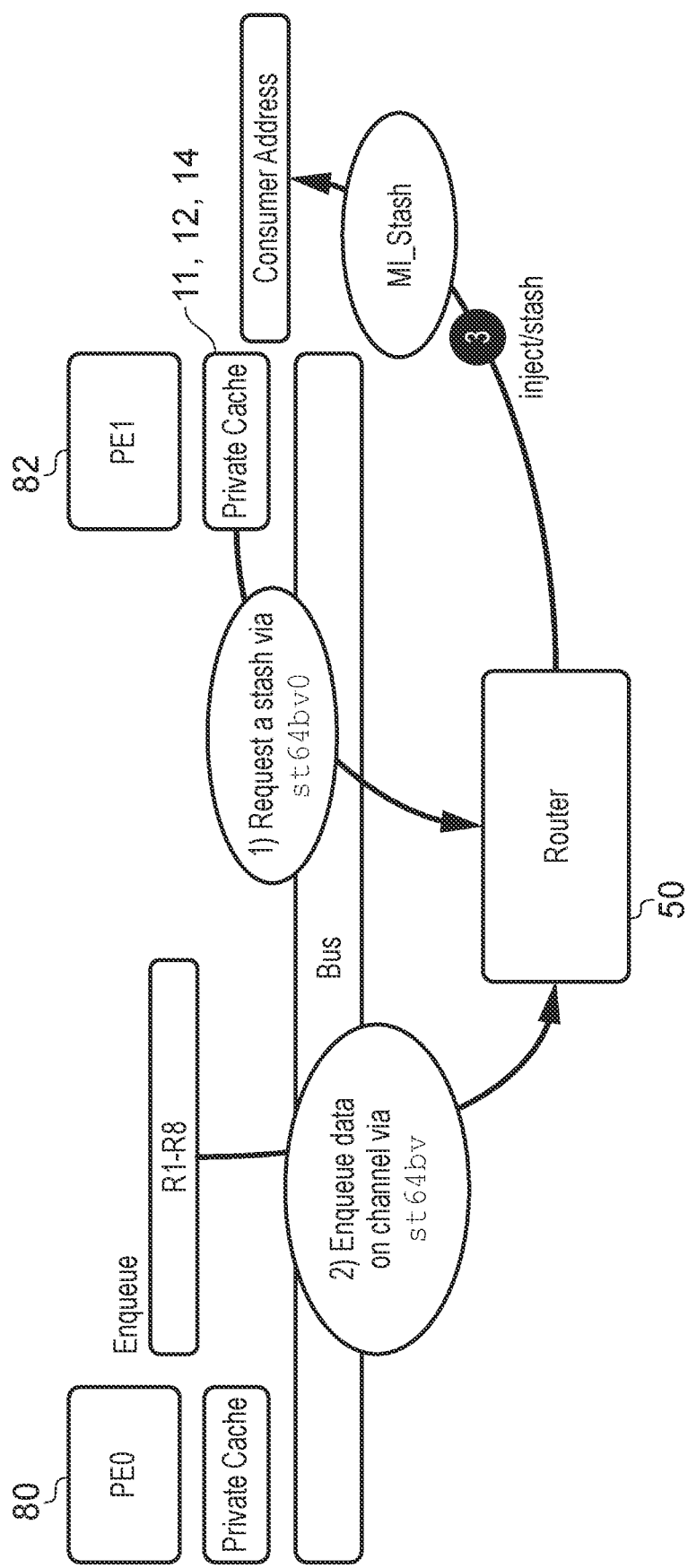
FIG. 4 schematically illustrates configuration of a message channel by a consumer node and passing of a message from a producer node to the consumer node via the message channel.

FIG. 4 shows in more detail operations performed by a producer node 80 producing messages on a given message channel and a consumer node 82 which subscribes to that channel. At step 1 of FIG. 4, the consumer node 82 issues a subscription request to the router 50 by issuing a 64 byte atomic non-coherent store operation which provides, as its write data, subscription information specifying information to be allocated to the channel consumer information structure 62 to define how the router 50 will write messages to a buffer region memory of 70 defined by the consumer 82 and provide event notifications to the consumer when an event notification condition is satisfied. This is described in more detail below. The subscription request specifies at its target address an address mapped to the command interface 58 of the router 50. The control circuitry 52 updates the channel consumer information structure 62 according to information specified in the subscription request.

At step 2 of FIG. 4, the producer node 80 issues the producer request, again using a 64 byte atomic non-coherent store operation, to enqueue data for a specified target message channel in the message queue 60 of the router 50. When the router 50 comes to process the producer request, it looks up the channel consumer information 62 for the target channel, and for each consumer reads the consumer-defined information specifying where the message is to be written to, and at step 3 issues a write request to write the message data to a consumer-defined address accessible to the consumer 82. As shown in FIG. 4, in this example the writing of the message data is performed by issuing a cache stashing request which may cause the write data to be stashed into a private cache 11, 12, 14 of the consumer 82. A cache stashing request is a request to allocate data into a private cache of a given node of the SoC, where that request is initiated by a requester other than the processing element associated with a private cache, hence in this case the stash request is initiated by the router 50 (in response to the producer request from the producer 80). By stashing the data directly into the private cache of the consumer node 82 this means that when the consumer node subsequently comes to read the data then the read request can hit in the consumer's cache and so this avoids the latency of having to read the data from main memory.

Figure 5:
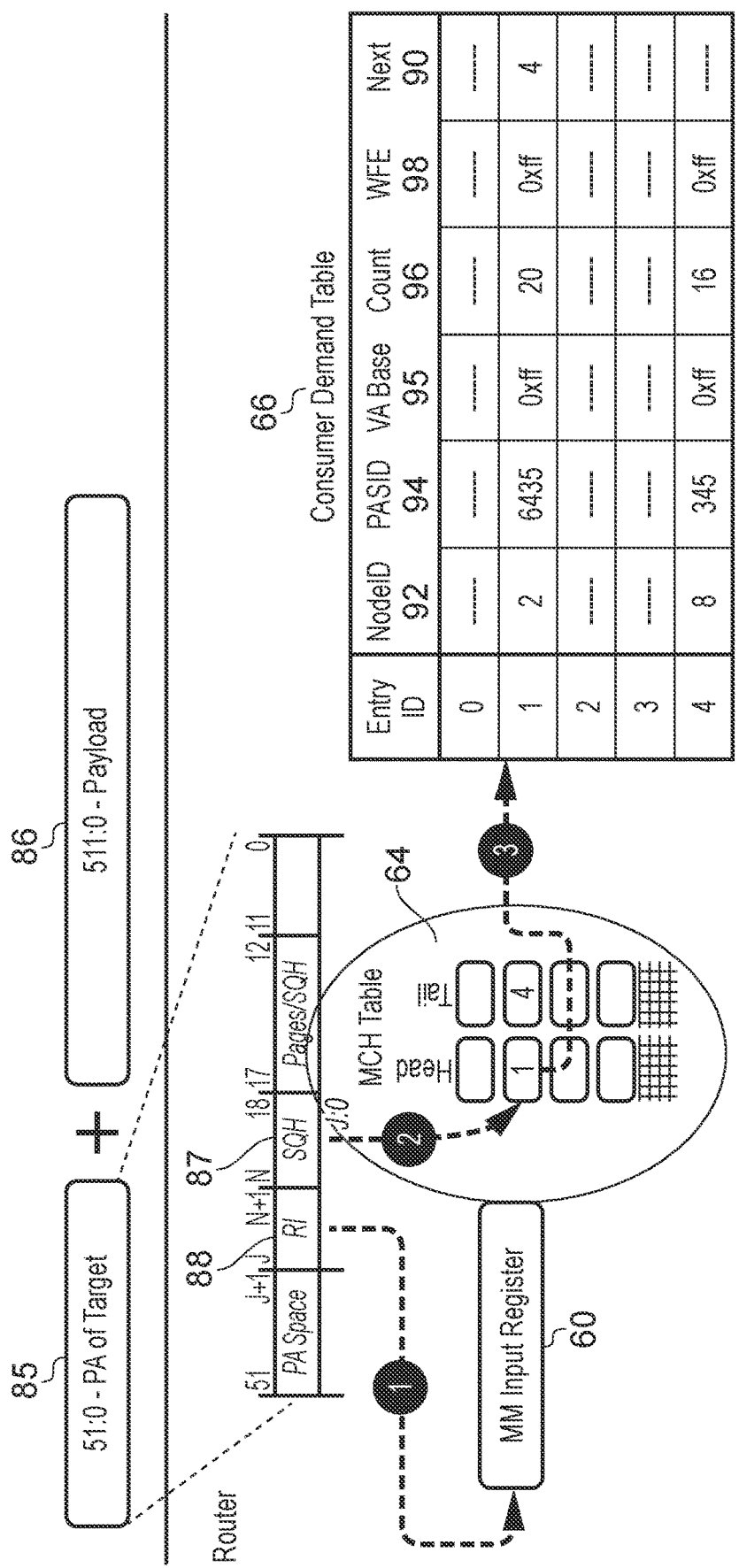
FIG. 5 shows an example of a producer request to provide a message on a target message channel and channel consumer information providing information configured by a consumer node subscribing to a given message channel.

FIG. 5 illustrates an example of a producer request, and of looking up the channel consumer information structure 62 using the lookup circuitry 54 of the message passing circuitry 50. The producer request includes a target physical address 85 and a message payload 86. The message payload may have any arbitrary meaning as understood by software executing on the producer and consumer, depending on the specific use case for which the message is being used, and so the router 50 need not prescribe any particular format for the payload 86. In this example the payload 86 is a 64-byte block of data but other implementations may support other payload sizes.

To avoid consuming bits of the payload for identifying an identifier of a target channel on which the message is sent, in this example part of the address bits of the target physical address 85 are used to identify the target channel identifier 87. An input register acting as the message interface 60 of the router 50 may in fact be mapped to a range of physical addresses within the physical address space, which share a common portion of address bits (marked RI, 88, in FIG. 5) of the target address. Hence, any physical address which has the address bits in portion 88 set to a pattern of bits mapped to the message interface 60 may be considered to act as a producer request. By allocating a range of addresses all mapped to the message interface, this frees up other bits of the target address 85 for indicating other information, as these other bits would not affect the mapping of the request onto the input register 60. The message channel identifier (a shared queue handle (SQH)) 87 may be identified in some of these other bits, to provide an identifier of the target message channel on which the message is sent. In the example shown in FIG. 5, the SQH 87 is identified in a portion of bits at a less significant part of the target address than the portion 88 used to identify the bits specifying whether the address is mapped to the message interface 60, so that a contiguous portion of physical address space is mapped to the message interface 60. However, it would also be possible to encode the SQH bits 87 at more significant bits than the message interface identifying bits 88, in which case the parts of the physical address space mapped to the message interface may include multiple discontiguous regions of physical address space.

The target channel identifier (SQH) 87 is used by the lookup circuitry 54 to lookup the channel lookup structure 64. Software on the producer and consumer nodes may agree the shared queue handle in advance, and a command sent to the command interface 58 (e.g. sent by either the producer software, or the consumer software, or some supervisory software) may be used to register a SQH for a given channel in the channel lookup structure 64 in advance of sending messages on that message channel.

By looking up the channel lookup structure 64 based on the SQH 87, this can identify the entry of the consumer demand table (channel consumer information table) 66 which is at the head of the linked list and this provides channel consumer information for the first consumer on the specified channel. If there are multiple consumers on the same channel then a next entry pointer field 90 of the selected channel consumer information entry identifies the next channel consumer information entry in the linked list and such pointers can be followed from entry to entry until an entry at the tail of the link list. Hence in the specific example shown in FIG. 5, the linked list for the particular channel specified by the current producer request comprises two entries, entry ID 1 and entry ID 4, since entry ID1 has the next entry pointer 90 set to 4.

As well as tracking the head of the linked list, a given entry in the channel lookup structure 64 can also specify the ID of the entry of the consumer demand table 66 that is at the tail of the linked list for the corresponding message channel. The tail entry identifier is not needed when looking up the structure in response to a producer request. However, the tail entry identifier can be useful to avoid needing to traverse the pointers of the linked list when a new subscription request for the channel is received from another consumer when there is already at least one other consumer subscribing to the same channel. In this case the entry of table 66 currently at the tail of the link list can be identified from the channel lookup structure 64, and then the next entry pointer 90 of the current tail entry in the link list can be updated to indicate the ID of the entry which is newly allocated to the consumer demand table 66 in response to the subscription request, and the tail entry identifier in the channel lookup structure 64 can be updated to indicate the identifier of the newly allocated entry. Hence, the next entry field 90 is not defined by the consumer which sent a subscription request, but is controlled by the router control circuitry 52.

The other pieces of information in each channel consumer information entry may (at least initially) be specified by the consumer node in a subscription request. Each entry of the channel consumer information table 66 may for example specify:

- A node identifier 92 used to identify a particular cache 11, 12, 14 into which message data should be stashed when a message is received on the channel to which the consumer is subscribing.
- An address space identifier 94 which identifies an address space associated with the buffer region 70 in which message data is to be written. The address space identifier helps to distinguish between different sets of address mappings which may be in use at the consumer node. In this example, the address space identifier is a physical address space identifier (PASID). Other examples could represent the address space identifier in a different way. For example, in some implementations a virtual machine identifier (VMID) may be associated with a particular virtual machine executing on the processing system and an address space identifier (ASID) may distinguish different address translation regimes associated with different processes supervised by the virtual machine—in that case the combination of VMID and ASID could identify the address space in a similar way to the PASID shown in FIG. 5.
- A virtual address base 95, which identifies the allocated consumer-defined region of address space 70 in the virtual address space of the consumer.
- A count value 96 which is used to count the number of messages received on the message channel to allow an event notification to be generated when a certain consumer-defined number of messages have been received on the corresponding message channel.
- (If event notifications are provided using a memory-based notification mechanism), an event notification address to which the router 50 should issue a write request once an event notification condition is satisfied (e.g. that the count 96 indicates that the consumer-defined number of messages have already been received on that channel). In this example the event notification address is referred to as a "WFE address" since the specific code example described below assumes the consumer core supports a "wait for event" (WFE) feature to allow the core to pause processing of a thread until an update to the address set as the WFE address is detected. However, using a WFE mechanism to monitor an update to a given address is not essential, and other examples could use another memory-based notification mechanism, where a write to a specified event notification address in memory is used as the event notification and the processor could use another mechanism (other than wait for event) to check for updates to the specified event notification address. Therefore, while some examples refer to a WFE address, it will be appreciated that this is just one example of an event notification address to which a memory-delivered notification can be provided.

Also, some implementations could omit the event notification (WFE) address 98 completely, and instead provide event notifications by sending an interrupt to the consumer node. In this case, there is no need to store the event notification address in the consumer demand table.

Translation of the virtual address base 95 and event notification address 98 (if provided) into physical addresses can take place either using address translation circuitry local to the router 50, or using address translation circuitry within the consumer node, or using a translation lookaside buffer actuated through a translation service or using a system memory management unit for example. Hence there are a range of options for implementing the virtual to physical address translation for converting the virtual addresses 95, 98 into physical addresses. Such translation could be a one-stage translation or a two-stage translation via an intermediate address (some systems may support both options).

There may also be a range of options for implementing the counting of the number of messages using the count field 96. In the examples shown in FIG. 5, when a consumer node subscribes to a given message channel the subscription request may specify a certain count value (e.g. 20 for entry ID1 shown in FIG. 5) which represents the number of messages received on the channel before an event notification is provided. Then, each time a message is received, the count value 96 may be decremented and when the account reaches zero then the event notification may be triggered. In this example, to allow the respective message payloads to be written to different offsets relative to the virtual address base 95, then either each time a message is received on the channel the virtual address base 95 could itself be incremented by an amount corresponding to the size of one message payload, or an additional field may be added to the consumer demand table 66 to track the number of received messages since the consumer subscribed to the channel so that field may be used to calculate the offset relative to the VA base 95 to be used when writing a particular message to the allocated buffer region 70. However, another approach could be that instead of having a decrementing counter, an incrementing encounter could be used so that the count value 96 starts at zero and there is a separate field to indicate the threshold number of messages at which the event notification should be triggered (with that threshold having been specified in the subscription command from the consumer), and in this case there is no need to increment the virtual address base 95 as instead the count field 96 may start at zero when the consumer first subscribes to the channel and then count upwards so it can also be used to derive the offset relative to the VA base 95 at which a given message is to be written.

The table 64, 66 shown in FIG. 5 can be cached in consumer information cache 56, meaning that entries can be swapped in and out of main memory by the router 50 based on a cache allocation policy such as least recently used.

By using the routing mechanism shown in FIG. 5, this means that each consumer end point or data target is responsible for allocating its own buffer space 70, so that for each channel there can be multiple end points and each end point may have a buffer attached to it (even a buffer as small as a single cache line). The consumer-defined threshold for triggering the even notification means that different consumers may define different sized buffers depending on their needs and the event notification can be triggered when the buffer is full. By defining the consumer subscriptions on a channel basis rather than at granularity of individual addresses, this means that multiple producers can provide messages on the same channel even if they do not share access to the same address.

Figure 6:
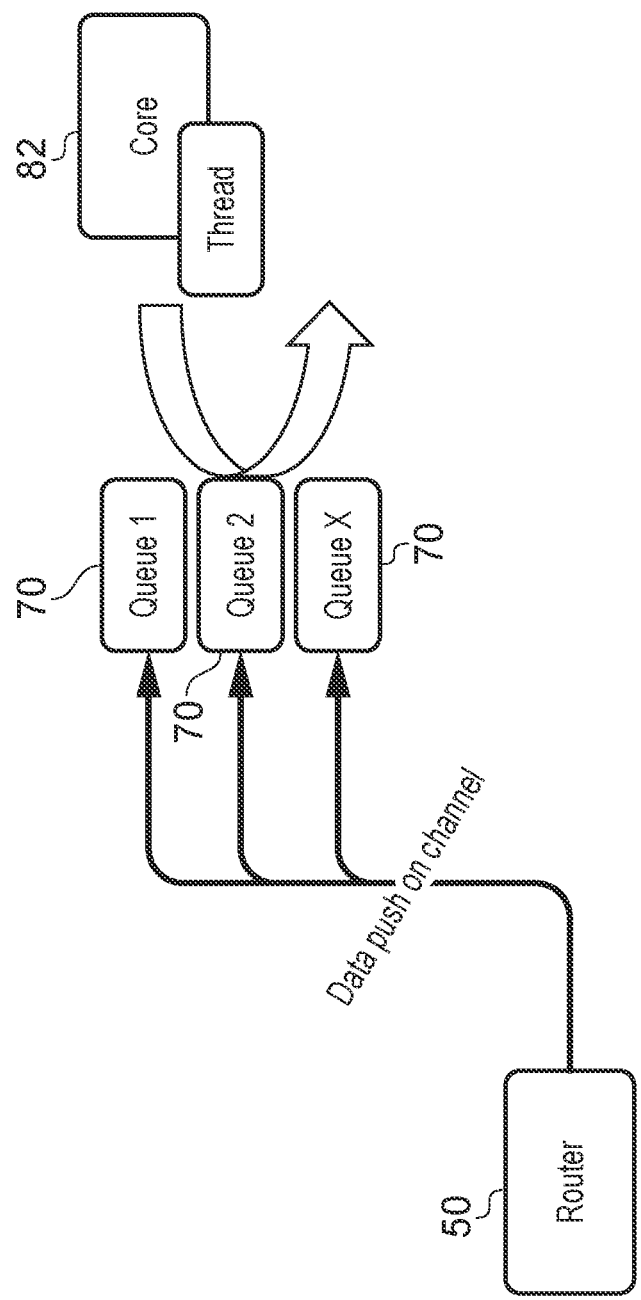
FIG. 6 shows, for comparison, an approach for a given consumer node to monitor multiple message channels.

FIG. 5 shows a basic implementation of the consumer demand table 66 which does not support use of event notification channels. As shown in FIG. 6, a problem may arise when a particular consumer node 82 wishes to subscribe to multiple channels and so establishes buffer regions 70 for a number of queues associated with different channels. The consumer may send subscription requests registering the locations of those queues with the router 50 for a number of message channels. Hence, as messages are received on the different channels the corresponding messages are pushed to the respective queues 70 by the router. However, the consumer node 82 then faces a problem in monitoring whether any of the queues have been updated.

Some processor core architectures may support a wait for event (WFE) feature where a core may execute a WFE instruction and this causes the core to switch to a power saving state or switch to processing of a different thread for a period while waiting for an event to occur. At the point where an event of one of a number of defined types occurs then the core is interrupted and may wake up and/or switch back to the thread which requested the WFE operation. One type of event which may trigger the core to be interrupted after a WFE operation may be a write, by another core or other thread on the same core, to an address defined as a WFE address by the core 82 which entered the WFE state. However, a problem is that some processor architectures may only support a single address being defined as the WFE address at a time, which means that, to enable monitoring of multiple queues, those queues may all need to be associated with the same address in the WFE field 98, so that on encountering the WFE event the core 82 would not know which particular queue encountered the event. Hence, the thread executing on the consumer core 82 would need to spin over all the queues to check to see if new data is available, by sending polling read requests to addresses associated with each queue, and this can be wasteful in terms of performance, as the number of queues can be large for some applications such as on web servers. Similarly, if the processor core architecture does not support any WFE mechanism at all, the event notification could, instead of being provided using a write to a WFE address, be provided to the consumer core 82 by interrupting the consumer core 82. Alternatively, another memory-delivered notification mechanism may be used (with a write to an event notification address being monitored by a mechanism other than the WFE mechanism described above). However, these alternatives also face a similar problem in that once interrupted or notified the consumer core does not know which queue has been updated, so again would need to spin over all queues.

Some processor cores may support a multi-address WFE mechanism which can monitor for updates to multiple addresses simultaneously, but many processor cores may not support this feature and it may be a significant development effort in modifying existing processor core designs to support this mechanism, since this may require instruction set architecture support for new instructions to implement the multi-address monitoring mechanism. In many cases system developers and processor designers may not wish to incur the development costs in adding this feature.

Figure 7:
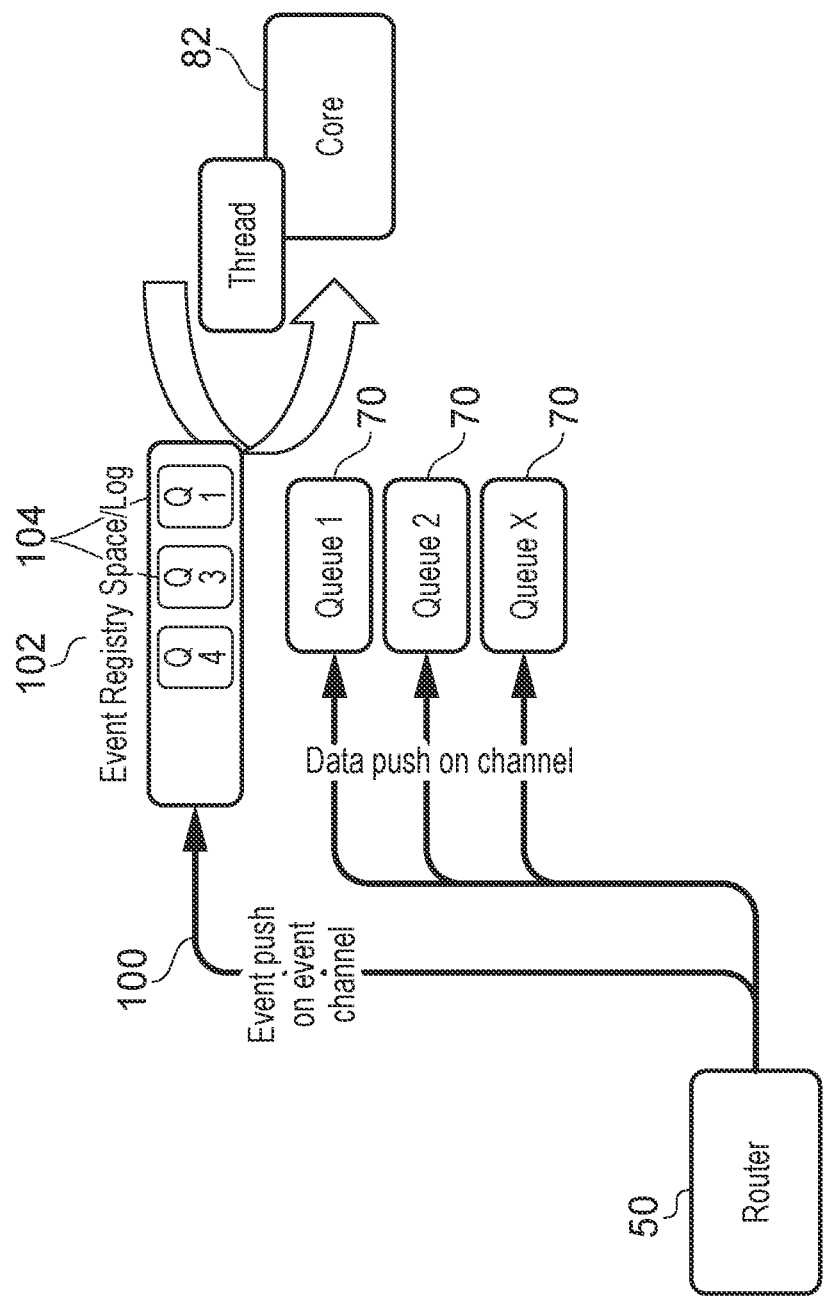
FIG. 7 shows use of an event notification channel to allow the consumer node to monitor a single address to obtain notifications regarding multiple message channels.

FIG. 7 shows a way of addressing this problem. Instead of building a solution into the processor core 82 itself which would require instruction set architecture support, this mechanism adds the ability to self-monitor message channel events within the router device 50 itself. The message channel architecture of router 50 can be adapted to support an optional additional event queue for an event notification channel. This event queue (shown as Event Registry Space/Log in FIG. 7) receives meta-data for each completed event on other channels, to indicate which message channel triggered the specific event. Events for a given multi-event registry are ordered in FIFO order by the router, so that when the calling thread at consumer core 82 checks its event registry queue the oldest event is seen first. The meta-data saved in the event log can be any identifying feature of a fixed width. For example, upon registering an event using its subscription command, the thread at the consumer node can provide a consumer-defined notification value (e.g. a 32-bit integer value that identifies a specific event to software). That number is registered to the relevant entry of the channel consumer information table 66 and stored within the event registry queue 102 for the event notification channel upon the event notification condition for the message channel defined by that entry being satisfied.

Hence as shown in FIG. 7, when the consumer core 82 sets up its subscriptions to the relevant message channels associated with respective buffers 70 acting as queues for the messages on those channels, the core 82 also sends a subscription request subscribing the core to an event notification channel 100 which has, as the buffer region 70 for receiving the messages on the event notification channel, a given region of memory defined as an event registry space 102 by the consumer core 82. When messages are received on any of the standard message channels then they are pushed into the respective buffers 70 for those channels as discussed earlier. When the event notification condition is satisfied for any of the monitored channels (e.g. the count indicates the previously defined threshold number of messages has been reached for a channel), then instead of providing an event notification (e.g. write to an event notification address or interrupt) directly to the consumer core 82, instead some event notification data 104 is pushed into the buffer region 102 of the event notification channel 100. The same event notification channel is shared between the different data channels so that if event notification conditions arise on any of those monitored data channels then some event notification data is pushed into the event registry log 102. However, a different consumer may have also specified an event notification channel relating to the same message channel as the consumer shown in FIG. 7, so (not shown in FIG. 7) it may be that the router 50 updates multiple event notification channels for the same message channel, when a relevant notification event occurs on that channel.

The consumer core 82 may define an event notification address associated with the event notification channel so that once a certain number of event notifications have been pushed into the event registry log 102 (relating to any of the monitored group of channels), then a write to the specified event notification address may be triggered and this may be monitored by a single-address monitoring mechanism at the consumer core 82 so that there is no need for the consumer core to monitor multiple queues using a polling mechanism. Alternatively, an interrupt may be sent to the consumer core when a certain number of event notifications have been pushed to the event notification channel. Either way, the information specified as the event notification data 104 within the event registry log 102 when an event notification condition arises on one of the associated data channels may be an arbitrary value selected by the consumer node 82 when configuring those channels so that the value read from the event registry log 102 can indicate which queue is associated with the corresponding event or indicates information on which type of event occurred, to allow the thread executing on the consumer core 82 to quickly identify which queue to check or what action to take, depending on the software-specific meaning of the event notification value 104 defined by the consumer in its original subscription request.

In summary, FIG. 7 shows how an additional message channel is registered as an event notification channel which is used by the thread to register multiple events of interest on associated data channels. From the point of view of the router 50, the event notification channel 100 functions the same as any other data channel so that similar considerations as to the counting of the number of message payloads inserted into that channel and triggering of event notifications may be performed. However, the event notification channel differs from the other message channels in that rather than having as its producer a producer node such as another processor core 9 which is sending producer requests to the router 50, the producer node for the event notification channel is the router 50 itself.

FIG. 8 shows use of the channel consumer information table 66 to support use of the event notification channel. Each entry still has the fields 90, 92, 94, 95, 96, 98 as discussed above. The event notification channel is allocated an entry of the channel consumer information table 66, just as for other message channels. In this example, for the entries which relate to message channels for which the consumer node has indicated that event notifications should be provided on an associated event notification channel instead of directly to the consumer node by writing to an event notification address, the event notification address field 98 can be reused to instead indicate the entry ID of the entry allocated for the event notification channel. For example in FIG. 8 the entries with IDs 1 and 3 both relate to message channels for which the consumer has indicated that event notifications should be provided on the event notification channel represented by entry ID 0. Although not shown in FIG. 8, each entry may also include a flag which indicates whether the event notification address field should be interpreted as an event notification address or as an identification of a particular event notification channel. It will be appreciated that there could also be other mechanisms for identifying the event notification channel relating to particular message channels, such as by having separate event notification address and event notification channel ID fields, or in an implementation where event notifications are provided using interrupts, the event notification address field 98 may not be provided at all and so a separate field may be used to indicate the ID of the entry associated with the event notification channel.

Hence, if an event notification condition is satisfied (e.g., determined based on the count field 96) for a given channel/consumer pair as represented by one of the entries in the channel consumer information structure 62, 66, then if that entry specifies that notification should be provided direct to the consumer, then the control circuitry 52 of the message passing circuitry 50 issues the notification direct to the consumer (e.g. as a write to the event notification address or an interrupt), while if event notifications for the specified channel and consumer are to be provided on event notification channel then instead the control circuitry 52 reads the entry of table 66 associated with the event notification channel (e.g. as specified in the entry ID in the event notification address field 98 of the channel which encountered the event notification condition) and then writes event notification data to that event notification channel by pushing the event notification data to a location within the event registry space 102 which is identified using the address space ID 94 and VA base 95 in the entry associated with the event notification channel. Again, a cache stashing mechanism can be used and the event notification data can be pushed to a cache identified by the node ID 92 in the entry of the event notification channel. The value of the event notification data 104 to be pushed to the event notification channel when an event arises on a given one of its associated message channels may be specified in an additional field 110 in the entry of the given message channel which encountered the event.

The instructions shown at the top part of FIG. 8 illustrate a code example for executing at the consumer node to subscribe to the relevant data message channels and an event notification channel. This code example is based on the implementation shown in FIG. 8 which supports a WFE mechanism, so the event notification address is described as a WFE address in this particular example.

The first atomic non-coherent store request (st64) at line 1 of the code example is an event channel subscription request which the consumer core issues to request subscription to an event notification channel. The target address of the store request is an address mapped to the command queue 58 of the message passing circuitry 50 and the remaining parameters of the store request are included within the write data of the store request. These parameters include a channel type parameter 112 which distinguishes that this request is for subscription to an event notification channel, the address 114 to be specified as the VA base 95 for the event notification channel, a consumer-defined count value 116 representing the threshold number of event notification items 104 to be written to the event notification channel before a WFE notification is performed to the consumer core 82, and the WFE virtual address 118 to which such notifications are to be made for the event notification channel.

The subsequent two subscription requests st64 at lines 2 and 3 of the code example are subscription requests for subscribing to related data channels. Although not shown in FIG. 8, the subscription requests may specify, as part of their command data (or as part of the target address of the store, similar to the mechanism for defining the shared queue handle (SQH) in a target address of the producer request as described earlier with respect to FIG. 5), a target channel identifier identifying the channel on which the consumer wishes to subscribe. These subscription requests also specify the VA base 95, WFE VA 98 and threshold value indicating a count of the number of messages to be received on the channel before the event notification is to be provided. In this example, these subscription requests relate to channels for which event notifications are to be provided on the event notification channel configured using the st64 at line 1. This is identified based on the WFE virtual address of the subscription requests at lines 2 and 3 being the same as the WFE virtual address 118 defined for the event channel subscription request at line 1. Hence, this approach requires the software to define the same WFE address for the event notification channel subscription request and for the group of monitored queues for which events are to be notified through the event notification channel. This is one way of identifying which queues should be tied together into a notification group, but it would be appreciated that other mechanisms could also be used, e.g. by using a SQH (either of the event notification channel if specified in data channel subscription requests, or of individual data message channels if specified in an event notification channel subscription request) to identify the relation between data message channels and an event notification channel (e.g. this may be useful for an alternative implementation where interrupts are used to provide event notifications to consumer cores and so the WFE field 98 may not be provided). Also, while not shown in FIG. 8 the subsequent subscription requests shown at lines 2 and 3 may specify as part of their command data the event notification data 110 to be pushed to the event channel when an event notification condition arises for those other message channels.

At line 4 of the code example, the core 82 executes a load-exclusive instruction specifying as its target address the WFE virtual address which was specified by the earlier subscription requests. This has the effect of registering the WFE virtual address as the address to be monitored by the WFE mechanism. Subsequently at line 5 the core executes a WFE instruction to cause the core to suspend processing of the current thread and either switch to a power saving state or allow a different thread to be executed. When an access to the WFE virtual address is triggered (e.g. detected by core 82 based on a snoop request sent from the interconnect 10) then this will wake up the core and/or cause it to return to the thread which executed the WFE instruction, which can then use the notification represented by the update to the WFE address to determine that the event registry space 102 may have been updated and can then read addresses of that event registry space to identify the event notification data 104 and determine how to process messages in the relevant queues.

Figure 9:
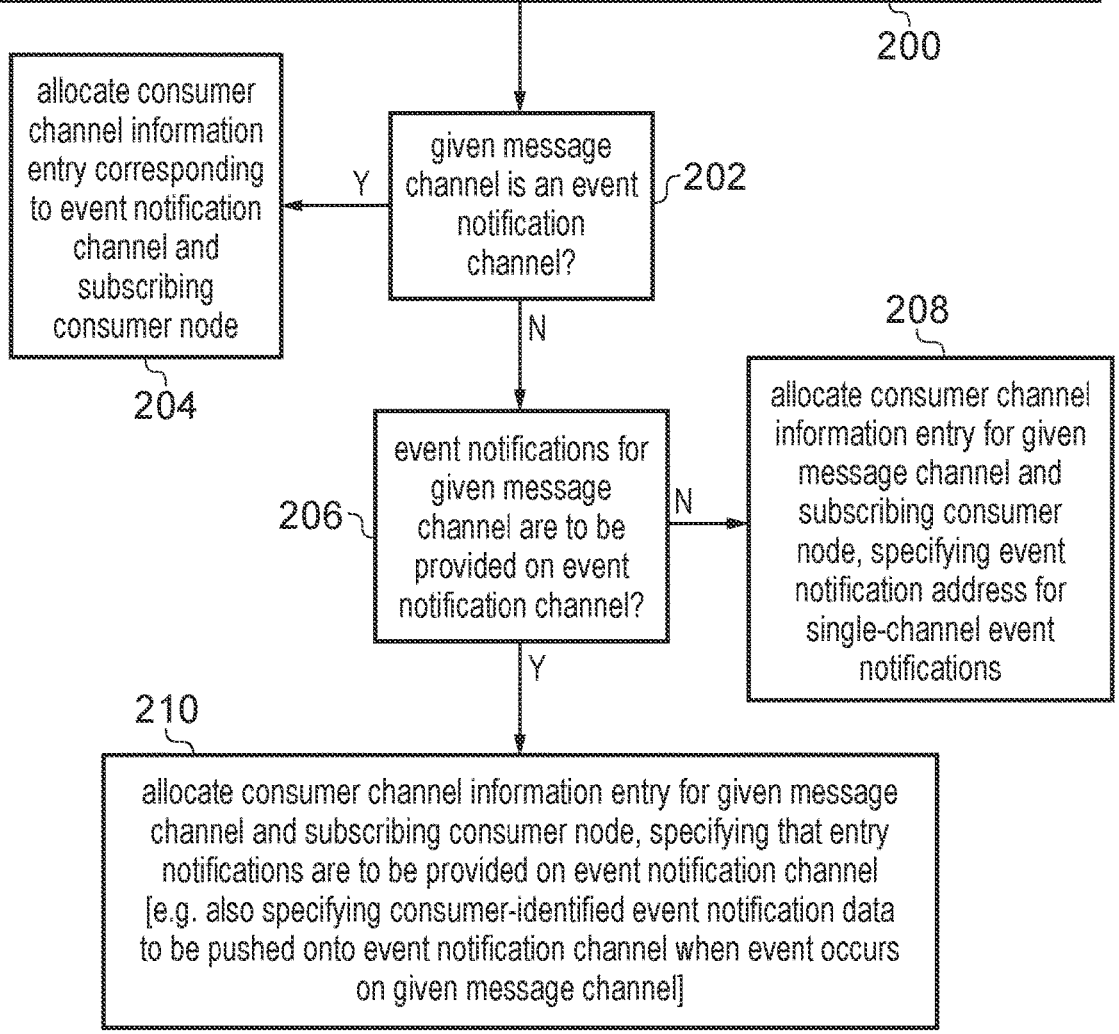
FIG. 9 is a flow diagram illustrating processing of a channel subscription request.

FIG. 9 is a flow diagram illustrating processing of a channel subscription request received from a subscribing consumer node wishing to subscribe to a given message channel (which could be either a data message channel or an event notification message channel). At step 200 the channel subscription request is received, e.g. based on an atomic non-coherent store request specifying a target address mapped to the command interface 58 of the message passing circuitry 50. The channel subscription request specifies subscription parameters which may include any of:

an identifier of the selected message channel to which the consumer node wishes to subscribe. This identifier could be the shared queue handle previously agreed with the producer. The identifier could be identified in different ways, for example in the command payload data of the command, or by using a similar approach to the one shown in FIG. 5 where part of the address bits of the target address of the store request specify the shared queue handle 89 (in this case again a range of addresses may all be mapped to the command interface 58 of the message passing circuitry 50 so that any address within that range can be interpreted as a command and other address bits may be used to distinguish the channel ID and other parameters).

The node identifier 92 of the cache associated with the subscribing consumer node into which message data is to be stashed for the given message channel.

A parameter 112 identifying whether the selected message channel is to be an event notification channel or a message channel other than an event notification channel. For example the subscription parameters may include a flag or other indicator specifying the type of message channel.

The VA base 95 providing an address of a consumer-defined region 70, 102 of address space to which message data is to be written for the selected message channel. This may also be associated with an address space ID 94 as discussed earlier to distinguish different translation regimes for translating the VA base 95.

Information specifying a consumer-defined event notification condition which, when satisfied, should trigger an event notification either using a direct notification using a write to an event notification address or a notification using an event notification channel. In this example the consumer-defined event notification condition is defined as a count value 116 which indicates a threshold number of messages to be passed on the given message channel before an event notification is triggered. However other implementations could also support other types of event notification condition which may be indicated by the consumer.

(If event notifications are supported using a memory-delivered notification mechanism), an event notification address (WFE address) which represents, for channels which are not to use the event notification channel, the event notification address 98 to which data is to be written when an event notification is to be provided. If the given message channel is to provide its event notifications via an event notification channel then this event notification address value may be set to be the same as the event notification address 118 selected for an earlier event notification channel subscription request as mentioned in FIG. 8. Alternatively another mechanism for indicating the relation between the given message channel and a corresponding event notification channel can be used, such as providing a separate field from the event notification address in the subscription parameters for identifying the association with the event notification channel and a data message channel.

If event notifications for the selected message channel are to be provided on an event notification channel, then the subscription request may also specify the consumer-defined event notification data 110 to be pushed to the event registry 102 when an event notification on the given message channel occurs.

It will be appreciated that not all implementations need define all of these types of subscription parameters. For example implementations which do not use cache stashing may omit to the node ID of the subscribing consumer node. Also, some implementations could eliminate the ability for the consumer to define the particular event notification condition at which event notifications are to be generated, for example instead the router may prescribe a certain default number of messages after which an event notification is provided and in this case there is no need for the subscription request to specify the consumer-defined event notification condition (the table 66 may still include a count field 96 for counting the number of messages, even if the threshold is not defined by the consumer). However, in practice supporting a consumer-defined event notification condition can be useful to allow flexibility in how the consumer sets up its buffer 70 for a given channel. Also, an implementation using interrupts to provide the event notifications can omit the event notification address.

In response to the channel subscription request, at step 202 the control circuitry 52 determines whether the given message channel for which the consumer node is requesting a subscription is an event notification channel and if so then at step 204 a consumer channel information entry is allocated corresponding to the event notification channel and the subscribing consumer node. For example, an invalid entry of the consumer demand table 66 may be selected for representing the channel consumer information for the event notification channel and the fields 92, 94, 95, 96, 98 of the newly allocated entry may be set based on the parameters of the subscription request, and the entry may be set as valid (e.g. using a valid field of the entry not shown in FIG. 8).

If the message channel was not an event notification channel, then at step 206 the control circuitry 52 determines whether the event notifications for the given message channel are to be provided on an event notification channel (e.g. this can be determined based on the event notification address defined in the subscription request as mentioned earlier or by another mechanism). The method proceeds to step 208 if an event notification channel is not to be used, or to step 210 if an event notification channel is to be used. Steps 208 and 210 have some common features—regardless of whether an event notification channel is to be used, the control circuitry 52 selects an invalid consumer channel information entry for allocation for the new consumer to that channel. The control circuitry may update the channel lookup structure 64 to allocate a new channel lookup entry (indicating the same entry as both head and tail of a linked list currently including only one entry) if no previous consumers have registered for that given message channel. If there was already another consumer on that channel, the new entry is assigned to the tail of the linked list extending the linked list for that channel, so the next entry pointer 90 in the entry previously at the tail of the linked list is updated to indicate the newly added entry of consumer demand table 66, and also the tail entry identifier in the looked up entry of the channel lookup structure 64 is updated to indicate the newly allocated entry as mentioned earlier. Either way, the allocated consumer channel information entry in consumer demand table 66 for the given message channel and subscribing consumer mode specifies fields 92, 94, 95, 96 based on the parameters of the subscription request.

Steps 208 and 210 differ in setting of information indicating whether event notifications are to be provided direct to the consumer node (step 208) or using the event notification channel (step 210). In this particular example, steps 208 and 210 differ in the setting of the event notification address field 98 and event notification data field 110. At step 208, if event notification channel is not to be used for providing event notifications, the event notification address 98 for the newly allocated entry is set to the event notification address specified in the subscription request. On the other hand, if event notifications for the given message channel were to be provided on an event notification channel then at step 210 the event notification address field 98 is set to an identifier of the entry of channel demand table 66 previously allocated for the event notification channel. Also, unlike at step 208, at step 210 the event notification data field 110 may be set to the consumer-defined value specified in the subscription request. This is not necessary at step 208. Again, alternative implementations (e.g. using an interrupt-based notification mechanism to signal events to the consumer core, instead of a memory-delivered notification mechanism) may set other information of the entry (e.g. a dedicated flag or field) to distinguish whether event notifications are to be provided direct to the consumer node (step 208) or by writing event notification data to a region of address space associated with the event notification channel (step 210).

Figure 10:
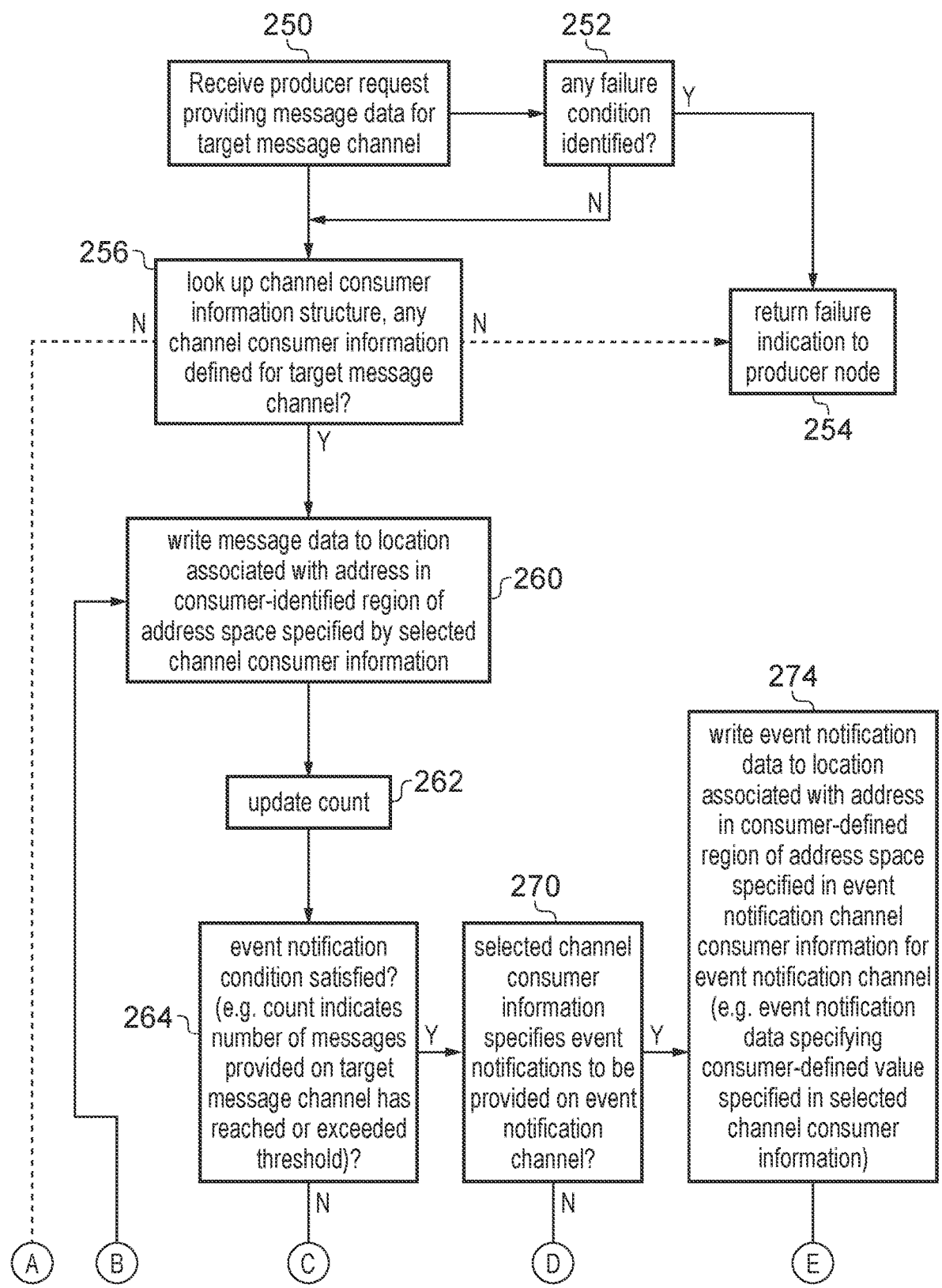
FIG. 10 is a flow diagram illustrating processing of a producer request and providing of an event notification.
Figure 10:
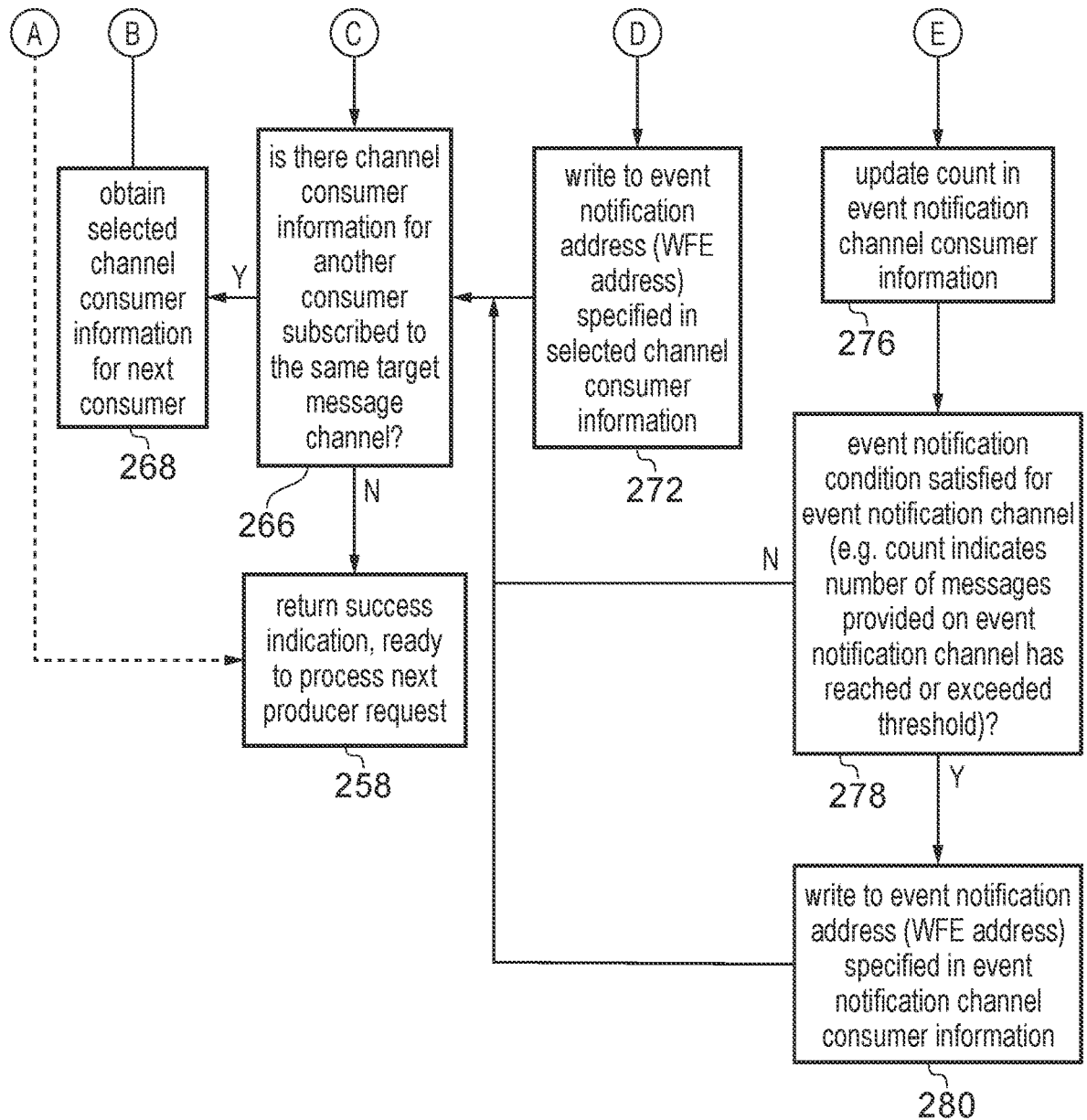

FIG. 10 is a flow diagram illustrating processing of a producer request received at the message interface 60 of the message passing circuitry 50. At step 250 the producer request is received providing message data 86 for a target message channel. In response, at step 252 the control circuitry 52 determines whether any failure condition has been identified for the producer request. For example, reasons for a possible failure could be that there is insufficient space in the message queue 60 for accommodating the received message, that the message passing circuitry 50 is currently busy and cannot handle the message, that the message payload is malformed, or that no valid channel information has been defined for the target message channel at the message passing circuitry 50 (e.g., before some supervisor software may need to configure the message passing circuitry 50 to indicate valid state for the specified message channel). It will be appreciated that other types of failure condition could also be implemented depending on the needs of a particular platform. If a failure condition is identified so that the message cannot currently be processed then at step 254 a failure indication is returned to the producer node which sent the producer request. This may be any returned signal or data value which indicates to the producer that the message passing failed. The producer may use this to determine whether to reattempt to send the message later or whether to request that the supervisory code configures the message passing circuitry 50 to enable message passing on the given message channel. In some examples the failure indication may include an indication of the reason for failure so that the producer can determine what action to take in response.

Meanwhile, in response to the producer request (either following identification that there is no failure condition at step 252, or in parallel with evaluation of whether any failure condition has arisen as shown by the arrow passing direct from step 250 to step 256) the lookup circuitry 54 looks up the channel consumer information structure 62 to determine whether there is any channel consumer information defined for the target message channel. This can be done either by issuing requests to read data from a structure in memory or by looking up the structure in internal registers or within a channel consumer information cache 56. If a cache is used and the request misses in the cache, a line fill request to request channel consumer information from memory may be issued.

If no channel consumer information has been defined for the target message channel then there are several options as shown by the dotted lines in FIG. 10. One option is to treat this as a failure and proceed to step 254 to return the failure indication to the producer node. Another option is simply to ignore the message but indicate to the producer request that the message passing was successful and so at step 258 a success indication could be returned to the producer, and then the message passing circuitry 50 may be ready to process the next received producer request. Either of these options is possible, depending on whether it is desired to inform producer requests when they have sent a message on a valid channel but there has not yet been any subscriber to that channel.

If at least one valid entry of channel consumer information is available for the target message channel (e.g. there was an entry in the channel lookup structure 64 defining that the channel consumer demand table 66 includes at least one valid entry for that channel, or alternatively in a CAM structure providing channel consumer information, at least one hit was identified), then the method proceeds to step 260. At step 260 a first item of channel consumer information for a subscriber to the target message channel is obtained and treated as selected channel consumer information. For example, the obtained information may be the entry of table 66 at the head of the linked list in the example described earlier.

At step 260 the control circuitry 52 requests a write of the message data 86 received in the producer request to a location associated with an address in a consumer-defined region 70 of address space as specified by fields 94, 95, 96 of the selected channel consumer information. For example the count field 96 may be used to identify an offset relative to the VA base 95 or alternatively a separate field tracking the offset may be used or in some implementations if the VA base 95 is incremented each time a new message is received then there is no need to apply an offset and the write can be to the location identified by the VA base 95 itself. The address space identifier 94 can identify the particular virtual address to physical address mapping to be used for obtaining a physical address corresponding to the specified virtual address.

Figure 11:
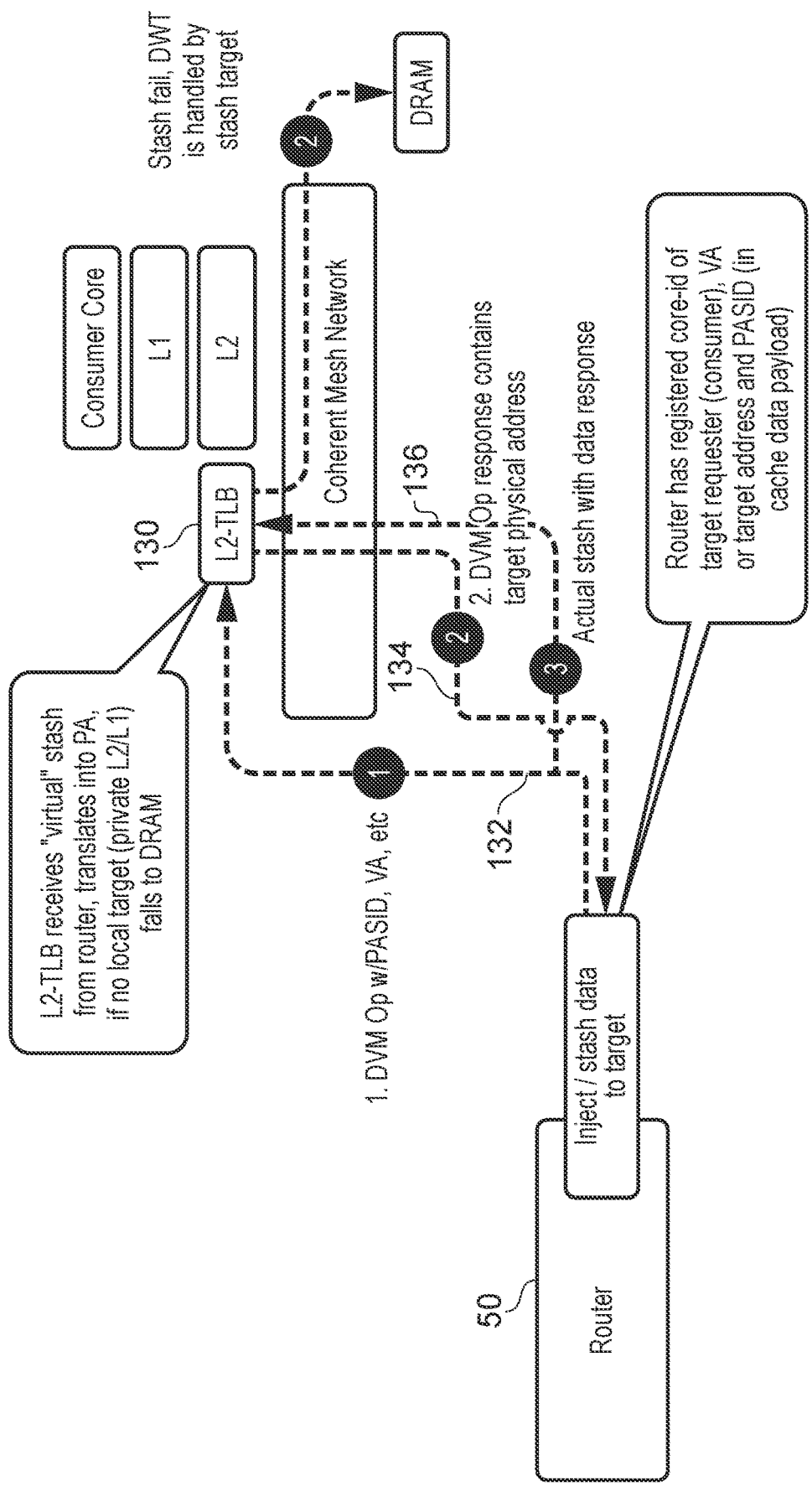
FIG. 11 illustrates use of virtual cache stashing.

The write of the message data at step 260 may use a cache stashing request as described earlier with respect to FIG. 4. FIG. 11 illustrates the cache stashing operation in more detail. A virtual cache stashing mechanism may be used whereby the initial stashing request sent to the consumer's cache may initially specify a virtual address (based on the VA base field 95) and the address space identifier 94 in the selected channel consumer information. This means that the message passing circuitry 50 does not itself need to support virtual to physical address translation as instead a translation look-aside buffer (TLB) 130 of a memory management unit at the consumer can be used to perform the address translation. This can simplify implementation of the router 50.

When sending the subscription request for the relevant channel the consumer node has registered the node ID 92 of the relevant cache in which a stash is to be performed, the virtual address 95 of the buffer region 70 and a corresponding address space ID 94 in the channel consumer information. Hence, when a message is received on the channel initially the router 50 can issue a snoop request 132 representing a virtual stashing request which specifies the registered virtual address and address space identifier and is issued to the node identified by the node ID, and specifies a parameter identifying that this represents a virtual stashing request which will then trigger the TLB 130 at the consumer node to translate the virtual address into a physical address according to the address space mapping of the translation regime identified by the address space identifier 94. The consumer provides a snoop response 134 indicating the translated physical address. After receiving the translated physical address, at step 3 of FIG. 11 a physical stash request 136 is sent to the cache at the consumer node and this physical stash request specifies the translated physical address and is accompanied by the actual data to be pushed on the relevant message channel, and the consumer node then allocates this data into one of its caches. This means that when a subsequent event notification arises on the relevant message channel then there is no need for the consumer core to fetch in the corresponding data from main memory (DRAM) as instead the data is already resident within its cache and so this can reduce access latency.

The consumer may be able to reject stashing requests depending on its current circumstances, for example the set of cache entries that can be allocated with data for the specified physical address may already be in use for other data that the core may not wish to evict. The particular criteria for deciding whether the accept or reject a stash request may be implementation specific and can vary depending on the needs of the consumer core. The consumer may be able to reject the cache stashing request either when receiving the initial snoop request at step 1, or when receiving the actual stash data at step 3, or at both opportunities. If the consumer core has decided that it cannot allocate its data into the consumer cache, then when the physical stash request at step 3 is received then the consumer can choose not to stash the data and instead may cause the data received from the router 50 to be written to a location in DRAM or other memory identified by the translated physical address. An alternative approach to the one shown in FIG. 11 could be that the snoop response at step 2 sending the translated physical address as a response to the virtual stash request at step 2 could indicate whether the consumer core will accept stashing, and in this case then the router 50 could write the message data direct to DRAM if the consumer has indicated that it will not accept the stash request.

An alternative approach could combine the messages sent at steps 1 and 3 of FIG. 11, into a single request which provides both the virtual address and the actual stashed data, so that there is no need to send a second request providing the stashed data, as a single request may trigger both the translation of the virtual address to a physical address and then cause the data to be stashed in the cache or written to memory if the consumer will not accept the stashed data.

Either way, this approach to support virtual stashing at step 260 of FIG. 10 avoids the need for the router to implement address translation which could be relatively complex when the router is shared between a number of producers and consumers.

Returning to FIG. 10, having written the message data at step 260, at step 262 the count field 96 of the selected channel consumer information entry is updated to reflect that another message has been pushed to the target message channel. For example in the approach shown in FIG. 8 the count field may be decremented and also either the virtual address base 95 may be incremented by the size of one message or alternatively a separate field not shown in FIG. 8 may be incremented to represent the count of messages received previously to allow this to be used as an offset relative to the VA base 95.

At step 264 the control circuitry 52 determines whether an event notification condition is satisfied for the target message channel based on the information specified in the selected channel consumer information entry. For example, the control circuitry determines whether the count field 96 indicates that the number of messages provided on the target message channel has reached or exceeded a threshold which may be a consumer-defined threshold set at the time when the consumer subscribed to the channel. For example, in the implementation shown in FIG. 8 the event notification condition may be considered satisfied when the count field 96 reaches zero. An alternative would be that the selected channel consumer entry information could include a threshold field specifying the threshold number of messages at which the event notification condition is satisfied and a count field 96 incrementing up towards the threshold may trigger the event notification condition to be satisfied when the count equals the threshold or exceeds the threshold.

If no event notification condition has occurred then there is no need to trigger any event notification, and at step 266 the lookup circuitry 54 determines whether there is channel consumer information for another consumer subscribed to the same target message channel for which the producer request was received. For example this may be identified based on the next entry pointer 90 of the selected channel consumer information used at steps 256, 260, 262, 264, or this may be based on whether multiple hit signals were received in a content addressable memory lookup. If there is another entry of channel consumer information for another consumer subscribing to the same target message channel then at step 268 the channel consumer information for that next consumer is treated as the selected channel consumer information and then the method returns to the step 260 to process that next consumer's entry the same as discussed earlier. If there is no further channel consumer information identified for another consumer on the same target message channel, then following step 266 the method continues to step 258 where the success indication is returned to the producer and the message passing circuitry 50 is ready to process the next producer request.

If at step 264 the control circuitry 52 determined based on the selected channel consumer information that the event notification condition was satisfied for the target message channel, then at step 270 the control circuitry 52 determines whether the selected channel consumer information specifies that event notifications are to be provided on an event notification channel. If not, then event notifications are to be provided direct to the consumer node and so at step 272 an event notification is sent to the consumer node. For example, the event notification address field 98 is read and a write is issued to update data associated with the event notification address as specified in the selected channel consumer information. If the consumer node has previously set up a WFE monitor and is waiting for a notification to the event notification address (as explained above in the code example of FIG. 8) then this may cause the consumer node to be woken up or interrupted and it can then read information associated with the appropriate message channel. Having generated the write to the event notification address at step 272, the method continues to step 266 to check for channel consumer information for another consumer the same as described earlier. In other examples, event notifications could be transmitted to the consumer node by sending an interrupt signal to the consumer node (e.g. the consumer node to send the interrupt to may be identified based on the node ID 92), rather than writing to a event notification address.

However, if at step 270 the control circuitry 52 identifies that the selected channel consumer information specifies that event notifications are to be provided on an event notification channel, then at step 274 the particular channel to be used as the event notification channel is identified based on the selected channel consumer information, for example by reading the event notification channel's entry ID from the event notification address field 98 as shown in the example of FIG. 8. The lookup circuitry 54 looks up the entry of the channel consumer information associated with that particular event notification channel and the control circuitry 52 uses the event notification channel's entry to control a write of event notification data to a location associated with an address in a consumer-defined region of address space 102 defined by the consumer as event registry space, as identified based on the VA base 95 of the event notification channel's entry of channel consumer information. The event notification data 104 to be written to the buffer region 102 of the event notification channel may be identified based on the event notification data 110 of the selected channel consumer information for the target message channel. Again the write of event notification data may use a virtual cache stashing mechanism as discussed for FIG. 11 at step 260.

At step 276 of FIG. 10 the count field 96 of the event notification channel consumer information is updated in a similar way to step 262 for the target message channel (and optionally an increment of the VA base 95 may also be performed depending on the implementation used).

At step 278 the control circuitry 52 determines whether an event notification condition is satisfied for the event notification channel, e.g. again based on whether the count field 96 of the event notification channel's consumer information entry indicates that the number of messages provided on the event notification channel has reached or exceeded the threshold, in a corresponding way to step 264 for the target message channel. Hence at step 280 if the event notification condition is satisfied for the event notification channel then the control circuitry 52 generates an event notification associated with the event notification channel, for example by triggering a write to the event notification address defined in the event notification address field 98 specified in the event notification channel's entry of channel consumer information. Alternatively, the event notification on the event notification channel could be performed by sending an interrupt signal to the consumer node. If no event notification condition was identified at step 278 then step 280 is omitted.

Either way, steps 274, 276, 278, 280 mirror the operations performed for the target message channel at steps 260, 262, 264 and 272. This means that, from the point of view of the message passing circuitry 50, the event notification channel functions just as any other message channel and so can reuse the circuit logic already provided for performing these operations for regular data message channels. The message passing circuitry 50 is provided with some additional logic to implement step 270 of checking what type of event notification is to be used and at step 274 to generate, as the event notification data, the data value specified in field 110 instead of pushing message data received from a producer other than the router 50.

Regardless of whether an event notification condition occurred at step 278 or not, following either step 278 or step 280 the method then proceeds to step 266 to check again for any other channel consumer information for other consumers on the same target message channel as discussed earlier. Note that it is possible that, while the event notification condition may arise at step 264 for one consumer, the event notification condition may not arise at step 264 for another consumer on the same channel. Similarly, the outcome at step 270 as to whether an event notification channel should be used for providing notifications to a given consumer, which particular entry of the table 66 is read to obtain the event notification channel's channel consumer information at step 274, and whether or not an event notification condition has arisen at step 278, may vary between different consumers subscribing to the same channel when a given message is received on that channel.

While FIGS. 9 and 10 show flow diagrams illustrating a certain ordering or dependency between steps, it will be appreciated that this is just one example and other examples may reorder steps or perform some steps shown sequentially in FIGS. 9 and 10 in parallel instead.

Hence, in summary the above examples provide a mechanism for a message channel routing device 50 to enable monitoring of multiple queues by a given consumer without requiring the consumer itself to support multi-address monitoring. This can allow a single wait-for-event mechanism for a single address to be used for monitoring multiple channels or sockets using the message channel router.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. Message passing circuitry for message passing between circuit nodes; the message passing circuitry comprising:
    lookup circuitry responsive to a producer request indicating message data provided on a target message channel by a producer node of the circuit nodes, to obtain, from a channel consumer information structure for specifying channel consumer information for a plurality of message channels and one or more consumer nodes of the circuit nodes subscribing to the message channels, selected channel consumer information associated with a given consumer node subscribing to the target message channel; and
    control circuitry to:
        write the message data indicated by the producer request to a location associated with an address in a consumer-defined region of address space determined based on the selected channel consumer information; and
        when an event notification condition is satisfied for the target message channel and the given consumer node:
            when event notifications for the target message channel are to be provided to the given consumer node in response to the event notification condition, provide the event notification to the given consumer node; and
            when event notifications for the target message channel are to be provided on an event notification channel of said plurality of message channels, cause event notification data to be written to a location associated with an address in a consumer-defined region of address space determined based on event notification channel consumer information associated with the event notification channel.

2. The message passing circuitry according to claim 1, in which the control circuitry and the lookup circuitry are configured to support the channel consumer information indicating that a plurality of message channels share the same event notification channel.

3. The message passing circuitry according to claim 1, in which when an event notification condition is satisfied for the event notification channel, the control circuitry is configured to provide an event notification to the given consumer node.

4. The message passing circuitry according to claim 1, in which the control circuitry is configured to provide the event notification to the given consumer node by issuing a write request requesting a write to a location associated with an event notification address indicated in the selected channel consumer information.

5. The message passing circuitry according to claim 1, in which the event notification data comprises a consumer-defined value specified in the selected channel consumer information associated with the given consumer node subscribing to the target message channel.

6. The message passing circuitry according to claim 1, in which the event notification condition comprises detection that a number of messages provided on the target message channel has reached or exceeded a threshold value.

7. The message passing circuitry according to claim 6, in which the threshold value is a consumer-defined threshold value specified by the given consumer node.

8. The message passing circuitry according to claim 1, in which the control circuitry and the lookup circuitry are configured to support a plurality of consumer nodes subscribing to a same message channel, with each of the plurality of consumer nodes associated with respective channel consumer information specifying a respective consumer-defined region of address space to which message data is to be written in response to a producer request for that message channel.

9. The message passing circuitry according to claim 1, in which the producer request comprises a write request issued by the producer node specifying, as a target address, an address mapped to a message interface associated with the message passing circuitry.

10. The message passing circuitry according to claim 1, in which when the control circuitry is unable to process the message indicated by a given producer request, the control circuitry is configured to cause a failure indication to be returned to the producer node in response to the producer request.

11. The message passing circuitry according to claim 1, in which the control circuitry is configured to write the message data indicated by the producer request to the location associated with the address in the consumer-defined region of address space, by issuing a cache stash request to request that the message data is stashed in a cache associated with the given consumer node.

12. The message passing circuitry according to claim 11, in which the cache stash request specifies a virtual address within the consumer-defined region of address space and an address space identifier indicative of a translation regime for translating the virtual address into a physical address at the given consumer node.

13. Message passing circuitry for message passing between circuit nodes; the message passing circuitry comprising:
   lookup circuitry responsive to a producer request indicating message data provided on a target message channel by a producer node of the circuit nodes, to obtain, from a channel consumer information structure for specifying channel consumer information for a plurality of message channels and one or more consumer nodes of the circuit nodes subscribing to the message channels, selected channel consumer information associated with a given consumer node subscribing to the target message channel; and
   control circuitry to:
      write the message data indicated by the producer request to a location associated with an address in a consumer-defined region of address space determined based on the selected channel consumer information; and
      when an event notification condition is satisfied for the target message channel and the given consumer node:
         when event notifications for the target message channel are to be provided to the given consumer node in response to the event notification condition, provide the event notification to the given consumer node; and
         when event notifications for the target message channel are to be provided on an event notification channel of said plurality of message channels, cause event notification data to be written to a location associated with an address in a consumer-defined region of address space determined based on event notification channel consumer information associated with the event notification channel;
      in which in response to a channel subscription request from a subscribing consumer node specifying an identifier associated with a given message channel, the control circuitry is configured to update the channel consumer information structure to specify channel consumer information for the subscribing consumer node subscribing to the given message channel.

14. The message passing circuitry according to claim 13, in which the channel subscription request specifies at least one of:
   the address of the consumer-defined region of address space to be specified in the channel consumer information for the subscribing consumer node subscribing to the given message channel;
   a consumer-defined event notification condition to be specified in the channel consumer information for the subscribing consumer node subscribing to the given message channel; and
   an event notification address to which the control circuitry is to write when providing the event notification to the subscribing consumer node for the given message channel.

15. The message passing circuitry according to claim 13, in which the channel subscription request specifies whether the subscribing consumer node is requesting subscription to an event notification channel or a message channel other than the event notification channel.

16. The message passing circuitry according to claim 13, in which when the channel subscription request specifies that the subscribing consumer node is requesting subscription to a given message channel other than the event notification channel, for which event notifications are to be provided on the event notification channel, the channel subscription request specifies a consumer-defined value to be provided as the event notification data on the event notification channel when the event notification condition is satisfied for the given message channel.

17. The message passing circuitry according to claim 13, in which the channel subscription request specifies an event notification address field for specifying an event notification address to which the control circuitry is to write when providing the event notification to the subscribing consumer node for the given message channel; and
   following processing of an event channel subscription request which specifies that the subscribing consumer node is requesting subscription to the event notification channel, in response to receipt of a channel subscription request for the given message channel for which the event notification address field specifies a same address as the event notification address field of the event channel subscription request, the control circuitry is configured to set the channel consumer information for the subscribing consumer node subscribing to the given message channel to indicate that event notifications for the given message channel are to be provided on the event notification channel.

18. The message passing circuitry according to claim 13, in which the channel subscription request comprises a write request issued by the subscribing consumer node specifying, as a target address, an address mapped to a command interface associated with the message passing circuitry.

19. A system-on-chip comprising:
a plurality of nodes; and
message passing circuitry to pass messages between the nodes, the message passing circuitry comprising:
   lookup circuitry responsive to a producer request indicating message data provided on a target message channel by a producer node of the system-on-chip, to obtain, from a channel consumer information structure for specifying channel consumer information for a plurality of message channels and one or more consumer nodes of the system-on-chip subscribing to the message channels, selected channel consumer information associated with a given consumer node subscribing to the target message channel; and
control circuitry to:
   write the message data indicated by the producer request to a location associated with an address in a consumer-defined region of address space indicated by the selected channel consumer information; and
   when an event notification condition is satisfied for the target message channel and the given consumer node:
      when event notifications for the target message channel are to be provided to the given consumer node in response to the event notification condition, provide the event notification to the given consumer node; and
      when event notifications for the target message channel are to be provided on an event notification channel of said plurality of message channels, cause event notification data to be written to a location associated with an address in a consumer-defined region of address space determined based on event notification channel consumer information associated with the event notification channel.

* * * * *